(12) United States Patent
Zhu et al.

(10) Patent No.: US 11,057,241 B2
(45) Date of Patent: Jul. 6, 2021

(54) NETWORK INTERWORKING METHOD, NETWORK ELEMENT, AND SYSTEM

(71) Applicant: Huawei Technologies Co., Ltd., Guangdong (CN)

(72) Inventors: Hualin Zhu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 58 days.

(21) Appl. No.: 16/364,543

(22) Filed: Mar. 26, 2019

(65) Prior Publication Data
US 2019/0222439 A1    Jul. 18, 2019

Related U.S. Application Data

(63) Continuation of application No. PCT/CN2016/100653, filed on Sep. 28, 2016.

(51) Int. Cl.
*H04L 12/46* (2006.01)
*H04W 8/18* (2009.01)
(Continued)

(52) U.S. Cl.
CPC .............. *H04L 12/46* (2013.01); *H04L 12/66* (2013.01); *H04L 63/029* (2013.01);
(Continued)

(58) Field of Classification Search
CPC ..... H04L 12/46; H04L 69/08; H04L 63/0892; H04L 63/029; H04L 12/66; H04L 45/04; H04W 8/18; H04W 88/08
See application file for complete search history.

(56) References Cited

U.S. PATENT DOCUMENTS 8,731,194 B2 * 5/2014 Hahn ................ H04W 12/0602
380/247
2013/0083773 A1 * 4/2013 Watfa ................ H04W 36/0033
370/331
(Continued)

FOREIGN PATENT DOCUMENTS

CN          1738308 A      2/2006
CN        103491584 A      1/2014
(Continued)

*Primary Examiner* — Alex Skripnikov
*Assistant Examiner* — Sharmin Chowdhury
(74) *Attorney, Agent, or Firm* — Slater Matsil, LLP

(57) ABSTRACT

Embodiments of the present application relate to the communications field, and provide a network interworking method, network element, and system, to improve efficiency of interworking between a first network and a second network. The method includes: after learning that the first network requests to connect to the second network, a network interworking configuration network element sends, to each network element in a first network element set, an identifier of a network element that is in a second network element set and that is connected to the network element in the first network element set, so that each network element in the first network element set performs network interworking with the network element that is in the second network element set and that is connected to the network element in the first network element set. The present disclosure is used for network interworking.

18 Claims, 17 Drawing Sheets

(51) Int. Cl.
  *H04L 29/06* (2006.01)
  *H04L 12/66* (2006.01)
  *H04W 88/08* (2009.01)
(52) U.S. Cl.
  CPC .......... *H04L 63/0892* (2013.01); *H04L 69/08* (2013.01); *H04W 8/18* (2013.01); *H04W 88/08* (2013.01)

(56) References Cited

U.S. PATENT DOCUMENTS

| | | | | |
|---|---|---|---|---|
| 2017/0374059 | A1* | 12/2017 | Ahmavaara | H04L 45/74 |
| 2018/0054734 | A1* | 2/2018 | Hahn | H04W 12/0609 |
| 2019/0132865 | A1* | 5/2019 | Zhou | H04L 5/0051 |
| 2019/0159268 | A1* | 5/2019 | Nilsson | H04W 76/10 |

FOREIGN PATENT DOCUMENTS

| | | | |
|---|---|---|---|
| CN | 103765819 | A | 4/2014 |
| JP | 2004072296 | A | 3/2004 |
| WO | 1999056486 | A2 | 11/1999 |

\* cited by examiner

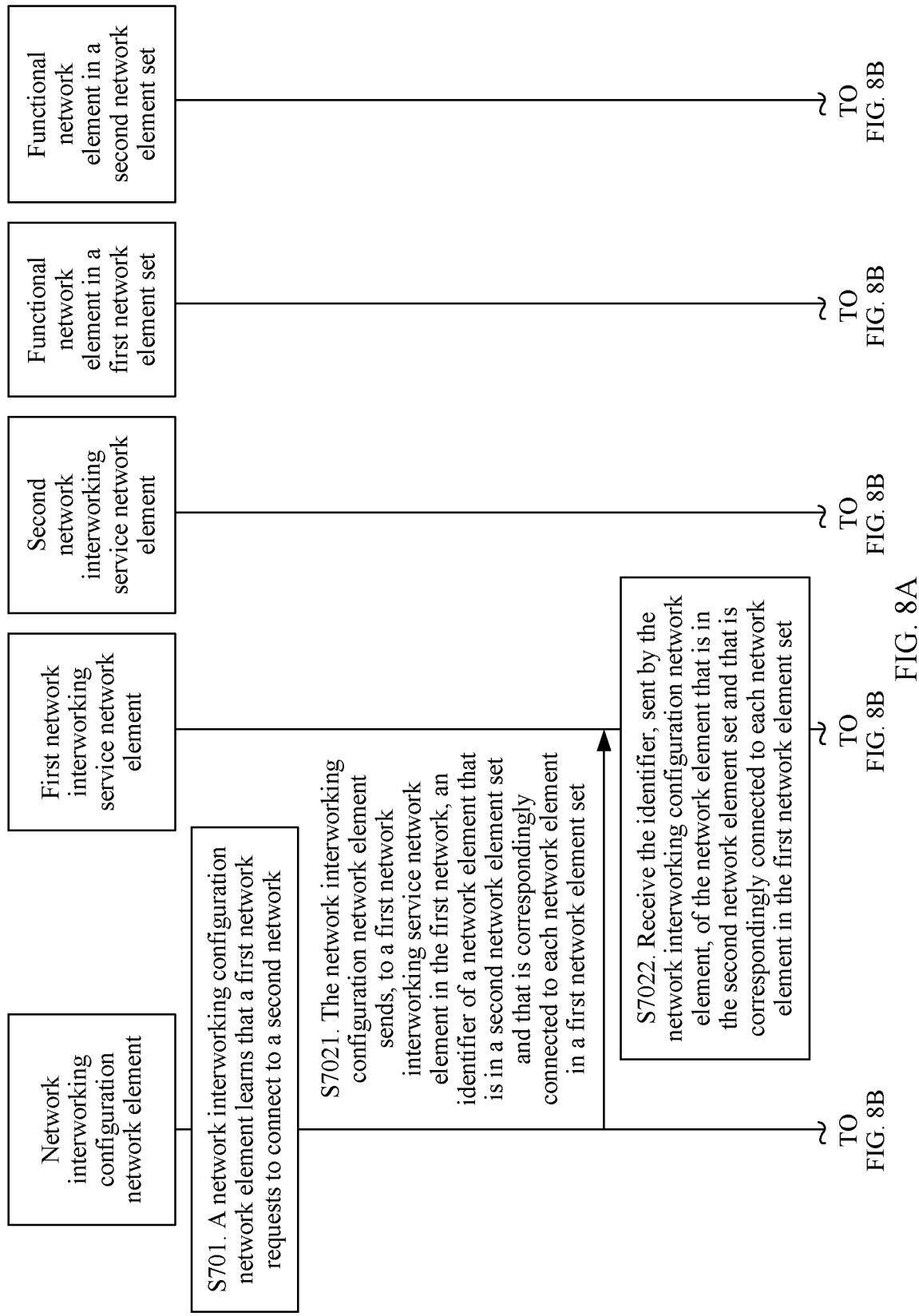

FIG. 8C

S7053. The second network interworking service network element sends, to each network element in the second network element set, the identifier of the network element that is in the first network element set and that is correspondingly connected to the network element in the second network element set S703. A functional network element receives a network element identifier S704. The functional network element completes network interworking with a network element indicated by the received network element identifier

NETWORK INTERWORKING METHOD, NETWORK ELEMENT, AND SYSTEM

CROSS-REFERENCE TO RELATED APPLICATIONS

This application is a continuation of International Application No. PCT/CN2016/100653, filed on Sep. 28, 2016. The disclosure of the aforementioned application is hereby incorporated by reference in its entirety.

TECHNICAL FIELD

The present application relates to the communications field, and in particular, to a network interworking method, network element, and system.

BACKGROUND

In communications networks, in addition to licensed-spectrum-based public networks deployed by operators, unlicensed-spectrum-based private networks that provide users with personalized and differentiated services are increasingly widespread. A private network is a mobile network deployed by an operator or a non-operator (for example, an enterprise, a family, or an individual). For example, a neutral host network (NHN) is a private network.

In addition to an internal communication service, the private network may further implement more and wider communication services by connecting to and interacting with an operator network. Therefore, how to configure (establish or delete) a connection between the private network and the operator network to implement network interworking becomes a particularly important task.

Currently, if a network element in the private network is deployed by an operator, network interworking between the private network and the operator network is usually configured by a network management system server in the operator network. Specifically, the network management system server in the operator network sends a network element identifier of the network element in the operator network to a network element in the private network and sends a network element identifier of the network element in the private network to the network element in the operator network, and the network element in the private network initiates a connection based on the received identifier of the network element in the operator network, to complete network interworking.

However, for a scenario in which a network element in the private network is deployed by a non-operator object, there is no pertinent implementation solution for network interworking between the private network and the operator network. If the solution in which network interworking is configured by the network management system server in the operator network is used, a user of the private network needs to register with the operator by providing a related parameter of the private network, and then a manager of the operator network triggers the network management system server in the operator network to perform a network interworking procedure. Consequently, network interworking efficiency is low.

SUMMARY

Embodiments of the present disclosure provide a network interworking method, network element, and system, to improve efficiency of interworking between a first network and a second network.

To achieve the foregoing objective, the following technical solutions are used in the embodiments of the present disclosure.

According to a first aspect, this application provides a network interworking method, applied to a network interworking configuration network element. The network interworking method provided in this application is used for network interworking between a first network and a second network. The method may specifically include: learning, by the network interworking configuration network element, that the first network requests to connect to the second network, and sending, by the network interworking configuration network element to each network element in a first network element set after learning that the first network requests to connect to the second network, an identifier of a network element that is in a second network element set and that is correspondingly connected to the network element in the first network element set, so that the network element in the first network element set performs network interworking with the network element that is in the second network element set and that is connected to the network element in the first network element set. The first network element set includes a network element that is in the first network and that is connected to the second network, and the second network element set includes a network element that is in the second network and that is connected to each network element in the first network element set in one-to-one correspondence.

In this way, when learning that the first network requests to connect to the second network, the network interworking configuration network element feeds back, to the network element that is in the first network and that is connected to the second network, an identifier of a network element that is in the second network and that is correspondingly connected to the network element in the first network for network interworking, so that the network element in the first network can complete interworking between the first network and the second network based on the received identifier. In the network interworking process, when learning that network interworking is requested, the network interworking configuration network element automatically delivers a network element identifier for network interworking, thereby avoiding a process of manually registering information to trigger a network interworking procedure during interworking between two networks, and improving efficiency of interworking between the first network and the second network.

The first network may be a private network, and the second network may be an operator network. The network interworking configuration network element may be deployed in the second network, or may be separately deployed. This is not specifically limited in this application.

With reference to the first aspect, in a possible implementation, the learning that the first network requests to connect to the second network may be specifically implemented as: receiving a network interworking request that is sent by a manager of the first network or a network interworking service network element in the first network and that is used to connect to the second network. The network interworking request includes an identifier of the first network and an identifier of the second network. When the network interworking request is received, it is learned that the first network requests to connect to the second network. Implementation is simple.

With reference to the first aspect or any possible implementation above, in another possible implementation, the network interworking request further includes at least one of the following parameters: an identifier of a network element in the first network element set, an identifier of the first network interworking service network element, a processing manner indication used to indicate that a connection is to be established or a connection is to be deleted, location information of the first network, scale information of the first network, a service feature of the first network, and a performance requirement of the first network. The location information of the first network, the scale information of the first network, the service feature of the first network, and the performance requirement of the first network that are included in the network interworking request are used to determine the second network element set. In this way, the network element included in the second network element set can be dynamically obtained based on a related parameter of the first network. Therefore, a network element that is in the second network and that is correspondingly connected to a network element in the first network is determined based on network performance of the first network, and network configuration flexibility is improved. In other words, the network interworking configuration network element can select, based on the related parameter of the first network, the network element included in the second network element set.

With reference to the first aspect or any possible implementation above, in another possible implementation, the sending, by the network interworking configuration network element to each network element in a first network element set, an identifier of a network element that is in a second network element set and that is correspondingly connected to the network element in the first network element set may be specifically implemented as: directly sending, by the network interworking configuration network element to each network element in the first network element set, the identifier of the network element that is in the second network element set and that is correspondingly connected to the network element in the first network element set. Network element configuration in the network is reduced.

With reference to the first aspect or any possible implementation above, in another possible implementation, the sending, by the network interworking configuration network element to each network element in a first network element set, an identifier of a network element that is in a second network element set and that is correspondingly connected to the network element in the first network element set may be specifically implemented as: sending, by the network interworking configuration network element to the first network interworking service network element in the first network, an identifier of a network element that is in the second network element set and that is correspondingly connected to each network element in the first network element set, so that the first network interworking service network element sends, to each network element in the first network element set, the identifier of the network element that is in the second network element set and that is correspondingly connected to the network element in the first network element set. The network interworking configuration network element sends, to each network element in the first network element set through forwarding by the first network interworking service network element in the first network, the identifier of the network element that is in the second network element set and that is correspondingly connected to the network element in the first network element set, so that when there are a relatively large quantity of network elements in the first network element set, occupied network resources can be effectively reduced, and resource utilization can be improved.

With reference to the first aspect or any possible implementation above, in another possible implementation, after the learning that the first network requests to connect to the second network, the method may further include: sending, to each network element in the second network element set, an identifier of a network element that is in the first network element set and that is correspondingly connected to the network element in the second network element set, so that each network element in the second network element set performs network interworking with the network element that is in the first network element set and that is connected to the network element in the second network element set.

With reference to the first aspect or any possible implementation above, in another possible implementation, the sending, by the network interworking configuration network element to each network element in the second network element set, an identifier of a network element that is in the first network element set and that is correspondingly connected to the network element in the second network element set may be specifically implemented as: directly sending, to each network element in the second network element set, the identifier of the network element that is in the first network element set and that is correspondingly connected to the network element in the second network element set; or sending, to a second network interworking service network element in the second network, an identifier of a network element that is in the first network element set and that is correspondingly connected to each network element in the second network element set, so that the second network interworking service network element sends, to each network element in the second network element set, the identifier of the network element that is in the first network element set and that is correspondingly connected to the network element in the second network element set.

With reference to the first aspect or any possible implementation above, in another possible implementation, the sending, to each network element in a first network element set after learning that the first network requests to connect to the second network, an identifier of a network element that is in a second network element set and that is correspondingly connected to the network element in the first network element set may be specifically implemented as: after learning that the first network requests to connect to the second network, if verifying that the first network is allowed to access the second network, sending, to each network element in the first network element set, the identifier of the network element that is in the second network element set and that is correspondingly connected to the network element in the first network element set. Network security is ensured.

With reference to the first aspect or any possible implementation above, in another possible implementation, the verifying that the first network is allowed to access the second network may be specifically implemented as: outputting a verification indication to a manager of the second network, and if an indication that is input by the manager and indicates that the first network is allowed to access the second network is received, verifying that the first network is allowed to access the second network; or if the first network meets a preset rule, verifying that the first network is allowed to access the second network.

The outputting a verification indication to a manager of the second network includes outputting content included in the network interworking request to the manager. That the first network meets a preset rule includes that the content included in the network interworking request meets the preset rule. It should be noted that, specific content of the preset rule may be set based on an actual requirement. This is not limited in this application.

With reference to the first aspect or any possible implementation above, in another possible implementation, the first network element set includes at least one of the following network elements: an authentication, authorization, and accounting server in the first network, a gateway in the first network, and a base station in the first network; a network element that is in the second network and that is correspondingly connected to the authentication, authorization, and accounting server in the first network includes an authentication, authorization, and accounting server in the second network; a network element that is in the second network and that is correspondingly connected to the gateway in the first network includes a security node in the second network; and a network element that is in the second network and that is correspondingly connected to the base station in the first network includes the authentication, authorization, and accounting server in the second network or the security node in the second network. Based on different network configuration requirements, the network element that is in the first network and that is connected to the second network may be configured differently, to implement diversified network deployment and improve network performance.

According to a second aspect of this application, another network interworking method is provided, applied to a network interworking service network element in a first network. The network interworking method provided in this application specifically includes: receiving, by the network interworking service network element, an identifier, sent by a network interworking configuration network element, of a network element that is in a second network element set and that is correspondingly connected to each network element in a first network element set, where the first network element set includes a network element that is in the first network and that is connected to a second network, and the second network element set includes a network element that is in the second network and that is connected to each network element in the first network element set in one-to-one correspondence; and sending, to each network element in the first network element set, the identifier of the network element that is in the second network element set and that is connected to the network element in the first network element set, so that each network element in the first network element set performs network interworking with the network element that is in the second network element set and that is correspondingly connected to the network element in the first network element set.

In this way, during network interworking between the first network and the second network, the network interworking service network element in the first network receives the identifier, fed back by the network interworking configuration network element, of the network element that is in the second network and that is correspondingly connected to each network element in the first network element set for network interworking, and then performs distribution, so that the network element in the first network can complete interworking between the first network and the second network based on the received identifier. In the network interworking process, when learning that network interworking is requested, the network interworking configuration network element automatically delivers a network element identifier for network interworking, thereby avoiding a process of manually registering information to trigger a network interworking procedure during interworking between two networks, and improving network interworking efficiency.

With reference to the second aspect, in a possible implementation, before the receiving, by the network interworking service network element, an identifier, sent by a network interworking configuration network element, of a network element that is in a second network element set and that is correspondingly connected to each network element in a first network element set, the method may further include: receiving, by the network interworking service network element in the first network, a connection request that is input by a manager of the first network and that is used to connect to the second network, and sending a network interworking request to the network interworking configuration network element. The connection request includes an identifier of the second network. The network interworking request includes an identifier of the first network and the identifier of the second network.

With reference to the second aspect, in a possible implementation, based on different network configuration requirements, the network element that is in the first network and that is connected to the second network may be configured differently, to implement diversified network deployment and improve network performance. Optionally, the first network element set that is in the first network and that is connected to the second network may include at least one of the following network elements: an authentication, authorization, and accounting server in the first network, a gateway in the first network, and a base station in the first network. Further optionally, a network element that is in the second network and that is correspondingly connected to the authentication, authorization, and accounting server in the first network may include an authentication, authorization, and accounting server in the second network. A network element that is in the second network and that is correspondingly connected to the gateway in the first network may include a security node in the second network. A network element that is in the second network and that is correspondingly connected to the base station in the first network may include the authentication, authorization, and accounting server in the second network or the security node in the second network.

It should be noted that, a network element included in the first network or the second network depends on a function or a type of the deployed network. This is not specifically limited in this application. The network element that is in the first network and that is connected to the second network may be some or all network elements in the first network, and may be specifically configured based on an actual requirement or according to a communications technology standard. This is not specifically limited in this application. A network element that is in the second network and that is connected to the first network may be specifically configured based on an actual requirement or according to a communications technology standard, or dynamically selected based on a network parameter. This is not specifically limited in this application.

With reference to the second aspect or any possible implementation above, in another possible implementation, to enable a second network side to more accurately evaluate and verify whether the first network can access the second network, the network interworking request may further include at least one of the following parameters: the identifier of the first network, the identifier of the second network, an identifier of the network interworking service network element, a processing manner indication used to indicate that a connection is to be established or a connection is to be deleted, location information of the first network, scale information of the first network, a service feature of the first network, and a performance requirement of the first network.

The parameter may be read from network configuration stored in a network device, or may be input by the manager of the first network. This is not specifically limited in this application. Certainly, the network interworking request may further include another parameter. This is not specifically limited in this application, either.

The service feature of the first network may include, but is not limited to, a voice service, video service, or the like. The performance requirement of the first network may include, but is not limited to, a delay requirement, a bandwidth requirement, or the like.

With reference to the second aspect or any possible implementation above, in another possible implementation, to improve network compatibility and adapt to an existing function of each network element in the first network, the sending, by the network interworking service network element to each network element in the first network element set, the identifier of the network element that is in the second network element set and that is connected to the network element in the first network element set may be specifically implemented as: directly sending, by the network interworking service network element to each network element in the first network element set, the identifier of the network element that is in the second network element set and that is connected to the network element in the first network element set.

In another possible implementation, to improve network compatibility and adapt to an existing function of each network element in the first network, the sending, by the network interworking service network element to each network element in the first network element set, the identifier of the network element that is in the second network element set and that is connected to the network element in the first network element set may be specifically implemented as: sending, by the network interworking service network element to a first network element in the first network element set, the identifier of the network element that is in the second network element set and that is correspondingly connected to each network element in the first network element set, so that the first network element forwards, to another network element in the first network element set, an identifier of a network element that is in the second network element set and that is connected to the another network element. The first network element may be any network element in the first network element set, or may be a network element that is in the first network element set and that is closest to the network interworking service network element in the first network.

According to a third aspect, this application provides still another network interworking method, applied to a network interworking service network element in a second network. The network interworking method provided in this application specifically includes: receiving, by the network interworking service network element, an identifier, sent by a network interworking configuration network element, of a network element that is in a first network element set and that is correspondingly connected to each network element in a second network element set, where the first network element set includes a network element that is in a first network and that is connected to the second network, and the second network element set includes a network element that is in the second network and that is connected to each network element in the first network element set in one-to-one correspondence; and sending, by the network interworking service network element in the second network to each network element in the second network element set, the identifier of the network element that is in the first network element set and that is connected to the network element in the second network element set, so that each network element in the second network element set performs network interworking with the network element that is in the first network element set and that is correspondingly connected to the network element in the second network element set.

In this way, during network interworking between the first network and the second network, the network interworking service network element in the second network receives the identifier, fed back by the network interworking configuration network element, of the network element that is in the first network and that is correspondingly connected to each network element in the second network element set for network interworking, and then performs distribution, so that the network element in the second network can complete interworking between the first network and the second network based on the received identifier. In the network interworking process, when learning that network interworking is requested, the network interworking configuration network element automatically delivers a network element identifier for network interworking, thereby avoiding a process of manually registering information to trigger a network interworking procedure during interworking between two networks, and improving network interworking efficiency.

It should be noted that, the first network element set and the second network element set are described in detail in the foregoing aspects, and details are not described herein again.

Further, a specific solution for distributing, by the network interworking service network element in the second network, a received network element identifier in the network interworking method provided in the third aspect is the same as a specific solution for distributing, by the network interworking service network element in the first network, a received network element identifier in the network interworking method provided in the second aspect. Details are not described herein again.

According to a fourth aspect, this application provides yet another network interworking method, applied to a functional network element in a first network or a second network. The method specifically includes: receiving a network element identifier sent by a network interworking configuration network element or a network interworking service network element in a network to which the functional network element belongs, and completing network interworking with a network element indicated by the received network element identifier. The received network element identifier is an identifier of a network element that is in a network to which the network to which the functional network element belongs requests to connect and that is correspondingly connected to the functional network element, and the functional network element includes any one of the following network elements: an authentication, authorization, and accounting server in the first network, a gateway in the first network, a base station in the first network, an authentication, authorization, and accounting server in the second network, and a security node in the second network.

In this way, during network interworking between the first network and the second network, the functional network element in the first network or the second network receives the identifier, sent by the network interworking configuration network element or the network interworking service network element in the network to which the functional network element belongs, of the network element that is correspondingly connected to the functional network element, and can complete interworking between the first network and the second network based on the network element identifier. In the network interworking process, a process of manually registering information to trigger a network interworking procedure during interworking between two networks is avoided, and network interworking efficiency is improved.

Optionally, if the functional network element belongs to the first network, the completing network interworking with a network element indicated by the received network element identifier is implemented as: sending a connection request to the network element indicated by the received network element identifier. If the functional network element belongs to the second network, the completing network interworking with a network element indicated by the received network element identifier is implemented as: receiving a connection request sent by the network element indicated by the network element identifier, and responding to the request to complete network interworking.

With reference to the fourth aspect, in a possible implementation, a network element that is in the second network and that is correspondingly connected to the authentication, authorization, and accounting server in the first network includes the authentication, authorization, and accounting server in the second network; a network element that is in the second network and that is correspondingly connected to the gateway in the first network includes the security node in the second network; and a network element that is in the second network and that is correspondingly connected to the base station in the first network includes the authentication, authorization, and accounting server in the second network or the security node in the second network.

According to a fifth aspect, an embodiment of the present disclosure provides a network interworking configuration network element. The network interworking configuration network element can implement a function performed by the network interworking configuration network element in the foregoing method example. The function may be implemented by hardware, or may be implemented by hardware by executing corresponding software. The hardware or the software includes one or more modules corresponding to the function.

With reference to the fifth aspect, in a possible implementation, a structure of the network interworking configuration network element includes a processor and a transceiver. The processor is configured to support the network interworking configuration network element in performing a corresponding function in the foregoing method. The transceiver is configured to support communication between the network interworking configuration network element and another network element. The network interworking configuration network element may further include a memory. The memory is configured to be coupled to the processor, and store a program instruction and data that are necessary to the network interworking configuration network element.

According to a sixth aspect, an embodiment of the present disclosure provides a first network interworking service network element. The first network interworking service network element is in a first network. The first network interworking service network element can implement a function performed by the network interworking service network element in the first network in the foregoing method example. The function may be implemented by hardware, or may be implemented by hardware by executing corresponding software. The hardware or the software includes one or more modules corresponding to the function.

With reference to the sixth aspect, in a possible implementation, a structure of the first network interworking service network element includes a processor and a transceiver. The processor is configured to support the first network interworking service network element in performing a corresponding function in the foregoing method. The transceiver is configured to support communication between the first network interworking service network element and another network element. The first network interworking service network element may further include a memory. The memory is configured to be coupled to the processor, and store a program instruction and data that are necessary to the first network interworking service network element.

According to a seventh aspect, an embodiment of the present disclosure provides a second network interworking service network element. The second network interworking service network element is in a second network. The second network interworking service network element can implement a function performed by the network interworking service network element in the second network in the foregoing method example. The function may be implemented by hardware, or may be implemented by hardware by executing corresponding software. The hardware or the software includes one or more modules corresponding to the function.

With reference to the seventh aspect, in a possible implementation, a structure of the second network interworking service network element includes a processor and a transceiver.

The processor is configured to support the second network interworking service network element in performing a corresponding function in the foregoing method. The transceiver is configured to support communication between the second network interworking service network element and another network element. The second network interworking service network element may further include a memory. The memory is configured to be coupled to the processor, and store a program instruction and data that are necessary to the second network interworking service network element.

According to an eighth aspect, an embodiment of the present disclosure provides a functional network element. The functional network element is a network element in a first network or a second network. The functional network element can implement a function performed by the functional network element in the first network or the second network in the foregoing method example. The function may be implemented by hardware, or may be implemented by hardware by executing corresponding software. The hardware or the software includes one or more modules corresponding to the function.

With reference to the eighth aspect, in a possible implementation, a structure of the functional network element includes a processor and a transceiver. The processor is configured to support the functional network element in performing a corresponding function in the foregoing method. The transceiver is configured to support communication between the functional network element and another network element. The functional network element may further include a memory. The memory is configured to be coupled to the processor, and store a program instruction and data that are necessary to the functional network element.

According to a ninth aspect, an embodiment of the present disclosure provides a network interworking system. The system includes the network interworking service network element in any aspect or any possible implementation above, at least one functional network element in a first network in any aspect or any possible implementation above, and at least one functional network element in a second network in any aspect or any possible implementation above.

With reference to the ninth aspect, in a possible implementation, the network interworking system may further include: the first network interworking service network element in any aspect or any possible implementation above and/or the second network interworking service network element in any aspect or any possible implementation above.

According to a tenth aspect, an embodiment of the present disclosure provides a computer storage medium, configured to store a computer software instruction to be used by the network interworking configuration network element. The computer storage medium includes a program designed to execute the foregoing aspect.

According to an eleventh aspect, an embodiment of the present disclosure provides a computer storage medium, configured to store a computer software instruction to be used by the first network interworking service network element. The computer storage medium includes a program designed to execute the foregoing aspect.

According to a twelfth aspect, an embodiment of the present disclosure provides a computer storage medium, configured to store a computer software instruction to be used by the second network interworking service network element. The computer storage medium includes a program designed to execute the foregoing aspect.

According to a thirteenth aspect, an embodiment of the present disclosure provides a computer storage medium, configured to store a computer software instruction to be used by the functional network element. The computer storage medium includes a program designed to execute the foregoing aspect.

Solutions provided in the fifth aspect to the thirteenth aspect are used to implement the network interworking methods provided in the first aspect to the fourth aspect, and therefore can achieve same beneficial effects as the first aspect to the fourth aspect. Details are not described herein again.

BRIEF DESCRIPTION OF DRAWINGS

To describe technical solutions in embodiments of the present disclosure more clearly, the following briefly describes accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

FIG. 8A to FIG. 8C are a schematic flowchart of another network interworking method according to an embodiment of the present disclosure;

DESCRIPTION OF EMBODIMENTS

The following clearly describes technical solutions in embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Before the embodiments of the present disclosure are described, an architecture of a network interworking scenario is first briefly described.

Figure 1:
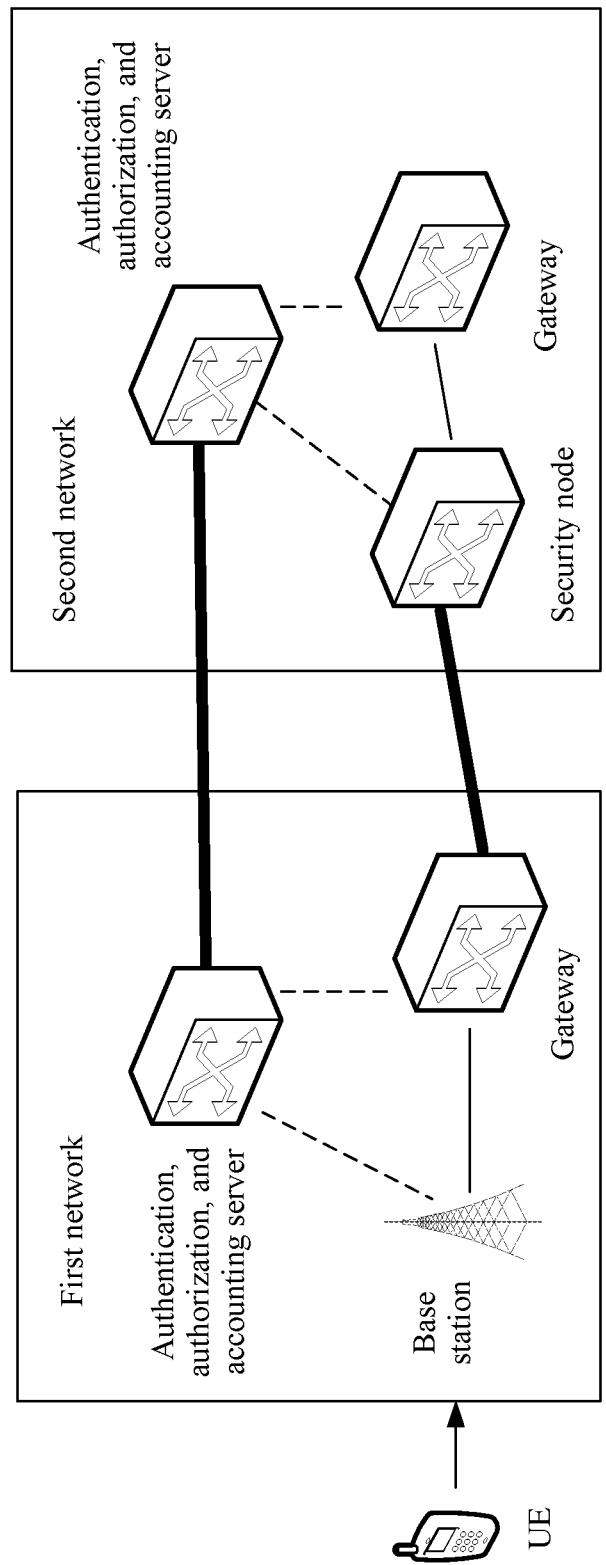
FIG. 1 is a schematic architectural diagram of an existing network interworking scenario.

For example, FIG. 1 shows a deployment architecture of a scenario of network interworking between a first network and a second network. In FIG. 1, a left box is the deployed first network, and the first network includes an authentication, authorization, and accounting server in the first network, a base station in the first network, and a gateway in the first network. A right box in FIG. 1 is the deployed second network, and the second network includes an authentication, authorization, and accounting server in the second network, a security node in the second network, and a gateway in the second network. Two bold lines in FIG. 1 represent connections between the first network and the second network. Network interworking in the present disclosure is establishing or deleting the two bold lines in FIG. 1.

Network elements at two ends of the connections shown by the two bold lines in FIG. 1 are merely examples, and do not limit network elements for connecting the first network and the second network. The network elements for connecting the first network and the second network are defined based on an actual requirement or according to a communications standard. This is not specifically limited in the embodiments of the present disclosure.

The first network may be an unlicensed-spectrum-based private network that provides users with personalized and differentiated services. The second network may be a licensed-spectrum-based public network deployed by an operator. Types of the first network and the second network are not specifically limited in the embodiments of the present disclosure.

Optionally, the first network may be an NHN network, and the second network may be an LTE network.

It should be noted that, the first network is not limited to the NHN network, the second network is not limited to the LTE network, and they may be communications networks of other standards.

For example, in the embodiments of the present disclosure, the second network may be a Global System for Mobile Communications (GSM) network, a Wideband Code Division Multiple Access (WCDMA) network, or another communications network; and the first network may be a home base station network or a wireless fidelity (Wi-Fi) network.

It should further be noted that, a network element in the first network may be deployed by an operator of the second network, or may be deployed by a non-operator object. This is not specifically limited in the embodiments of the present disclosure.

In the second network in the architecture in FIG. 1, the authentication, authorization, and accounting server is mainly responsible for user authentication and service authorization.

Optionally, the authentication, authorization, and accounting server may be a mobility management entity (MME), or may be a mobile-network control-plane network element such as an authentication, authorization, and accounting (AAA) server. The security node is configured to establish a secure connection to user equipment (UE), to ensure that user data is transparent to the local network. The security node may be a core network device of the operator, or may be an access network device of the operator. The gateway is an anchor for user data transmission.

In the first network in the architecture in FIG. 1, the authentication, authorization, and accounting server in the first network is mainly responsible for tasks such as access management, session management, and mobility management in the local network. The gateway in the first network is configured to transmit user data. The base station in the first network is an access device.

It should be noted that, one first network can be simultaneously connected to a plurality of second networks. FIG. 1 is merely an example for description, and shows only one second network, but does not limit a quantity of second networks connected to the first network. When the first network is connected to a plurality of second networks, processes of interaction between the first network and all the second networks are the same. In the embodiments of the present disclosure, a process of interaction between the first network and only one second network is described, and a network architecture is not specifically limited.

Further, based on those shown in FIG. 1, the second network further includes a network management system network element for interworking between the first network and the second network.

As described in the background, when network interworking is implemented by a network management system in the second network, for a scenario in which a network element in the first network is deployed by a party other than the operator of the second network, a user of the first network needs to register with the operator by providing a related parameter of the first network, and then a manager of the second network triggers a network management system server in the second network to perform a network interworking procedure. Consequently, network interworking efficiency is low.

In view of this, a basic principle of the present disclosure is deploying a network interworking configuration network element. The network interworking configuration network element sends an identifier of each of a network element in the first network and a network element in the second network that correspond to each other to the opposite network element for network interworking.

The network interworking configuration network element may be separately deployed, or may be deployed in the second network. This is not specifically limited in the embodiments of the present disclosure.

Figure 2:
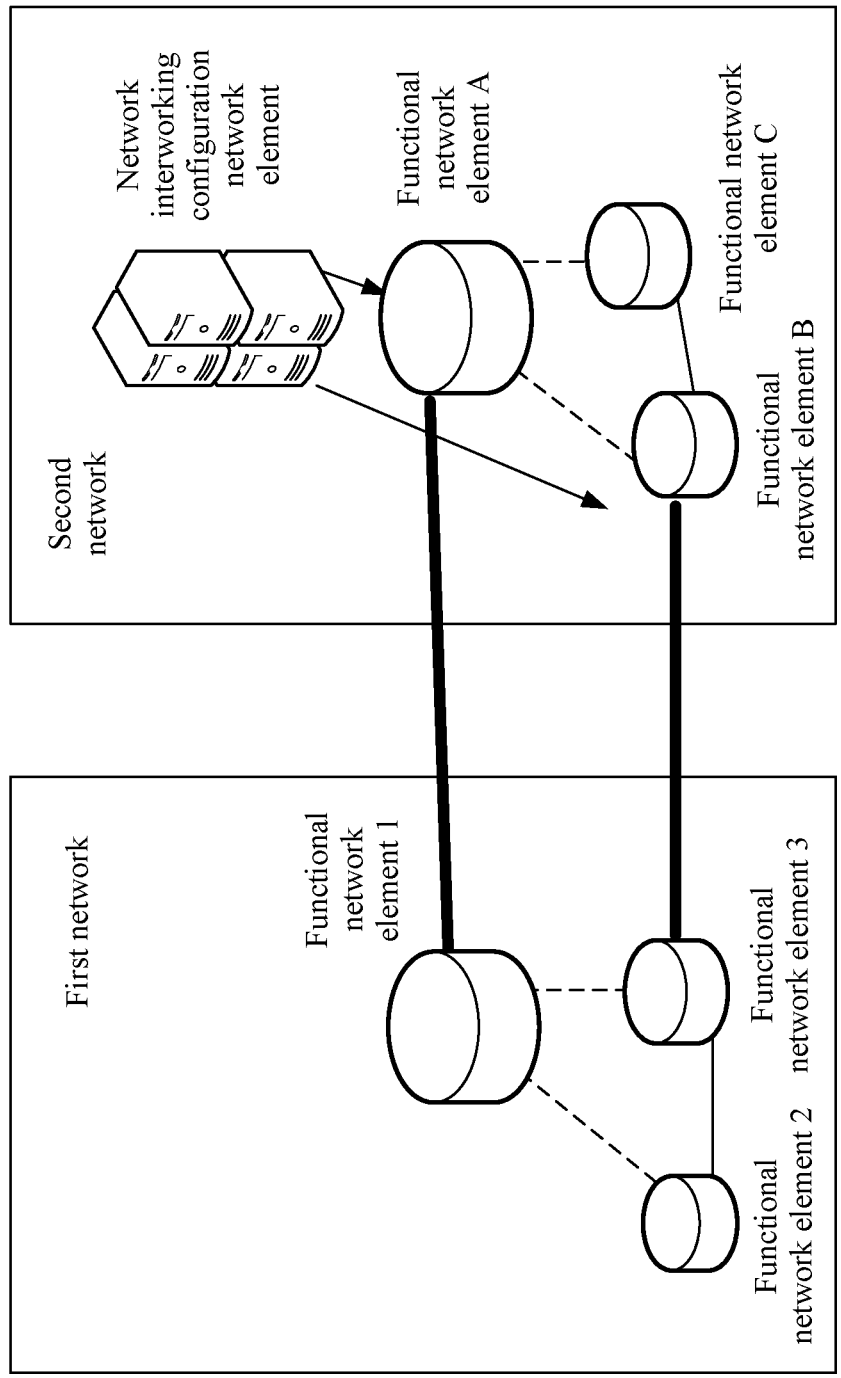
FIG. 2 is a schematic architectural diagram of another network interworking scenario according to an embodiment of the present disclosure.

A network interworking method provided in the embodiments of the present disclosure may be applied to a network architecture shown in FIG. 2. In the network architecture shown in FIG. 2, based on the network architecture shown in FIG. 1, a network interworking configuration network element is deployed in the second network, and the authentication, authorization, and accounting servers, the base station, the gateways, and the security node in FIG. 1 are identified by functional network elements. The network architecture shown in FIG. 2 and the network architecture shown in FIG. 1 are the same in other aspects, and details are not described.

Figure 3:
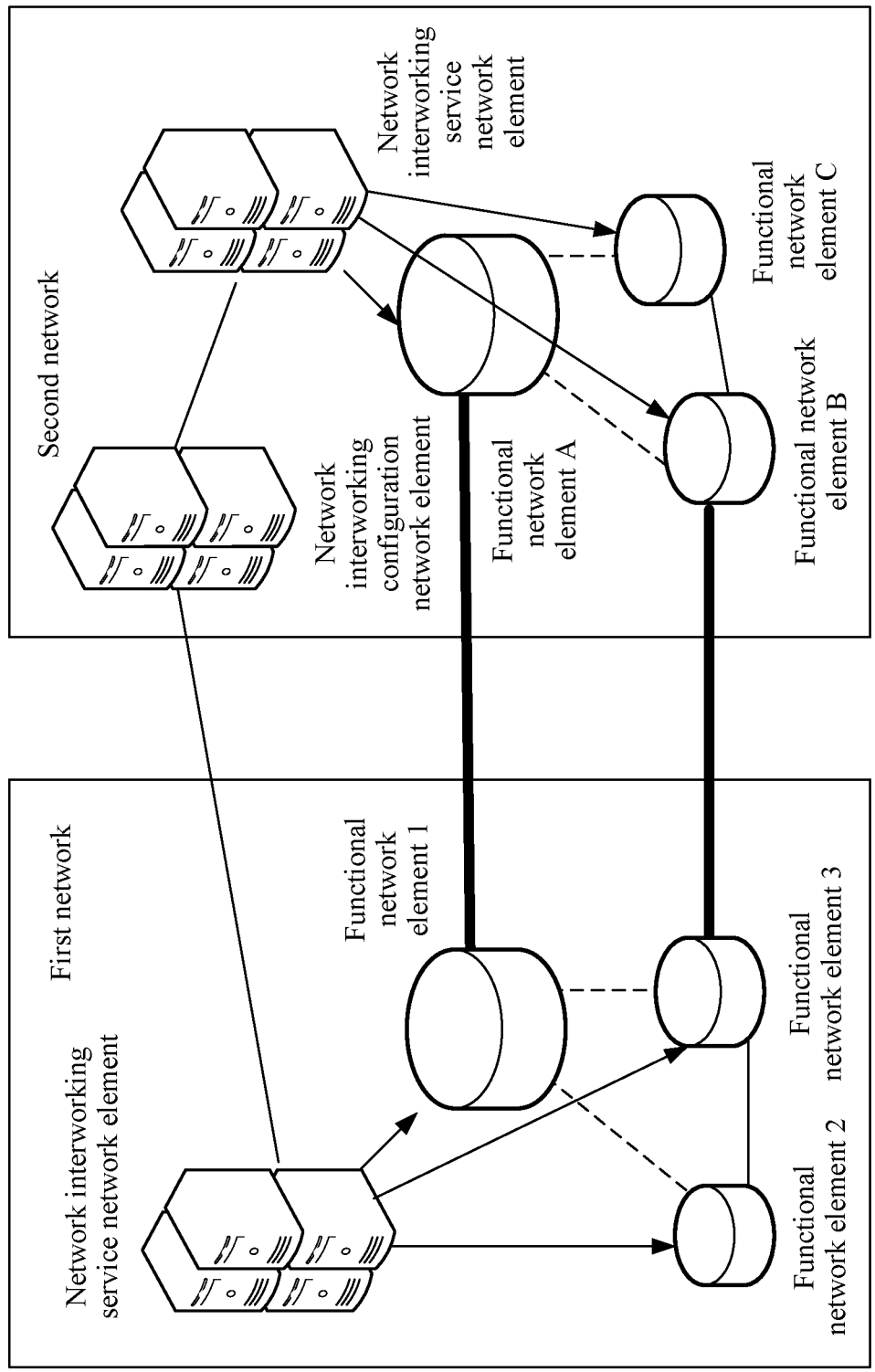
FIG. 3 is a schematic architectural diagram of still another network interworking scenario according to an embodiment of the present disclosure.

Further, the network interworking method provided in the embodiments of the present disclosure may be applied to a network architecture shown in FIG. 3. In FIG. 3, based on FIG. 2, a network interworking service network element may be further deployed in each of the first network and the second network, to cooperate with the network interworking configuration network element in sending an identifier of a network element.

It should be noted that, whether the network architecture shown in FIG. 2 or FIG. 3 is used may be configured based on an actual requirement. This is not specifically limited in the embodiments of the present disclosure.

It should be noted that, one first network can access at least one second network, and FIG. 2 and FIG. 3 each show deployment of a connection between one first network and only one second network, but do not limit a quantity of second networks that one first network can access. When one first network can access a plurality of second networks, processes of interworking between the first network and all the second networks are the same. In the embodiments of the present disclosure, a process of deploying a connection between one first network and only one second network is described, and other processes are not described.

Optionally, the network interworking configuration network element or the network interworking service network element deployed in FIG. 2 and FIG. 3 may be separately deployed as an independent functional network element, or may be divided into a plurality of functional modules deployed on a plurality of network elements. The plurality of functional modules cooperate to implement a function of the network interworking configuration network element or the network interworking service network element. Any implementation of interworking between the first network and the second network by using a function of the network interworking configuration network element or the network interworking service network element described in the embodiments of the present disclosure falls within the protection scope of the present disclosure. Deployment manners of the network interworking configuration network element and the network interworking service network element are not specifically limited in the embodiments of the present disclosure.

The network interworking method provided in the embodiments of the present disclosure may be performed by the network interworking configuration network element and the functional network elements in the network architecture shown in FIG. 2, or may be performed by the network interworking configuration network element, the network interworking service network elements, and the functional network elements in the network architecture shown in FIG. 3.

Figure 4:
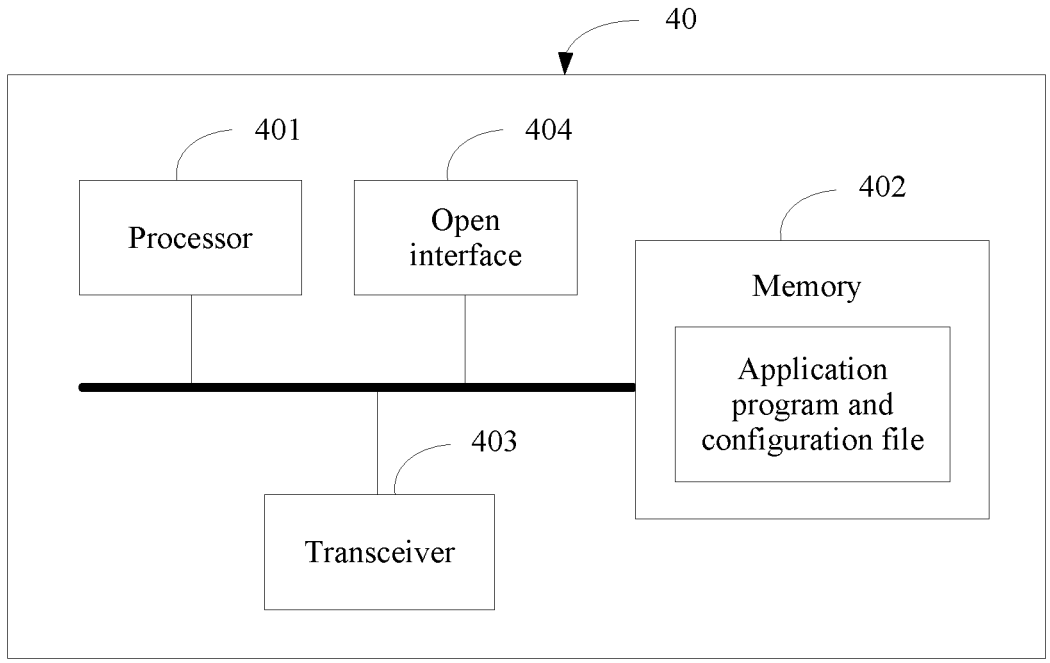
FIG. 4 is a schematic structural diagram of a network interworking configuration network element 40 according to an embodiment of the present disclosure.

FIG. 4 is a schematic structural diagram of a network interworking configuration network element 40 related to the embodiments of the present disclosure. The network interworking configuration network element 40 may be the network interworking configuration network element deployed in FIG. 2 or FIG. 3, and may be separately deployed or may be deployed depending on another network element.

As shown in FIG. 4, the network interworking configuration network element 40 may include a processor 401, a memory 402, a transceiver 403, and an open interface 404.

The following describes in detail the components of the network interworking configuration network element 40 with reference to FIG. 4.

The memory 402 may be a volatile memory, such as a random access memory (RAM); or a non-volatile memory, such as a read-only memory (ROM), a flash memory, a hard disk drive (HDD), or a solid-state drive (SSD); or a combination of the foregoing types of memories, configured to store a related application program and configuration file that can implement the method of the present disclosure.

The processor 401 is a control center of the network interworking configuration network element 40, and may be a central processing unit (CPU), or may be an application-specific integrated circuit (ASIC), or may be configured as one or more integrated circuits for implementing the embodiments of the present disclosure, for example, one or more microprocessors (DSP) or one or more field programmable gate arrays (FPGA). The processor 401 may run or execute a software program and/or module stored in the memory 402 and invoke data stored in the memory 402, to perform various functions of the network interworking configuration network element 40.

The transceiver 403 may be a communications port, a communications interface, or the like of the network interworking configuration network element 40, configured to exchange information or messages with another network element.

Figure 5:
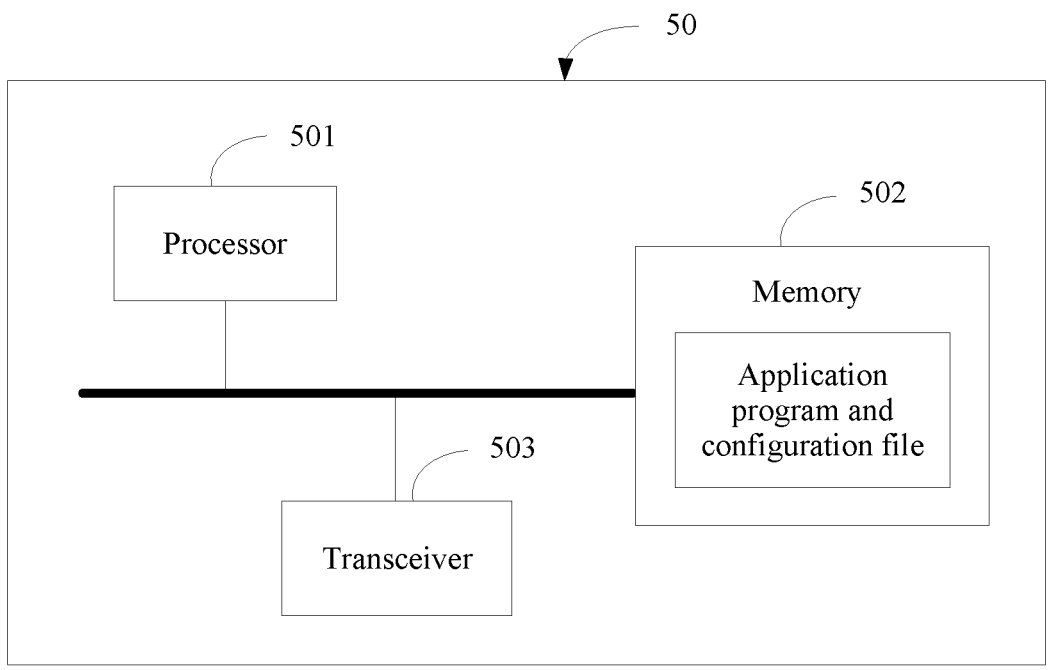
FIG. 5 is a schematic structural diagram of a network interworking service network element 50 according to an embodiment of the present disclosure.

Further, FIG. 5 is a schematic structural diagram of a network interworking service network element 50 related to the embodiments of the present disclosure. The network interworking service network element 50 may be the network interworking service network element deployed in the first network or the second network in FIG. 3, and may be separately deployed or may be deployed depending on another network element.

As shown in FIG. 5, the network interworking service network element 50 may include a processor 501, a memory 502, and a transceiver 503.

The following describes in detail the components of the network interworking service network element 50 with reference to FIG. 5.

The memory 502 may be a volatile memory, such as a RAM; or a non-volatile memory, such as a ROM, a flash memory, an HDD, or an SSD; or a combination of the foregoing types of memories, configured to store a related application program and configuration file that can implement the method of the present disclosure.

The processor 501 is a control center of the network interworking service network element 50, and may be a CPU, or may be an ASIC, or may be configured as one or more integrated circuits for implementing the embodiments of the present disclosure, for example, one or more DSPs or one or more FPGAs. The processor 501 may run or execute a software program and/or module stored in the memory 502 and invoke data stored in the memory 502, to perform various functions of the network interworking service network element 50.

The transceiver 503 may be a communications port, a communications interface, or the like of the interworking service network element 50, configured to exchange information or messages with another network element.

Figure 6:
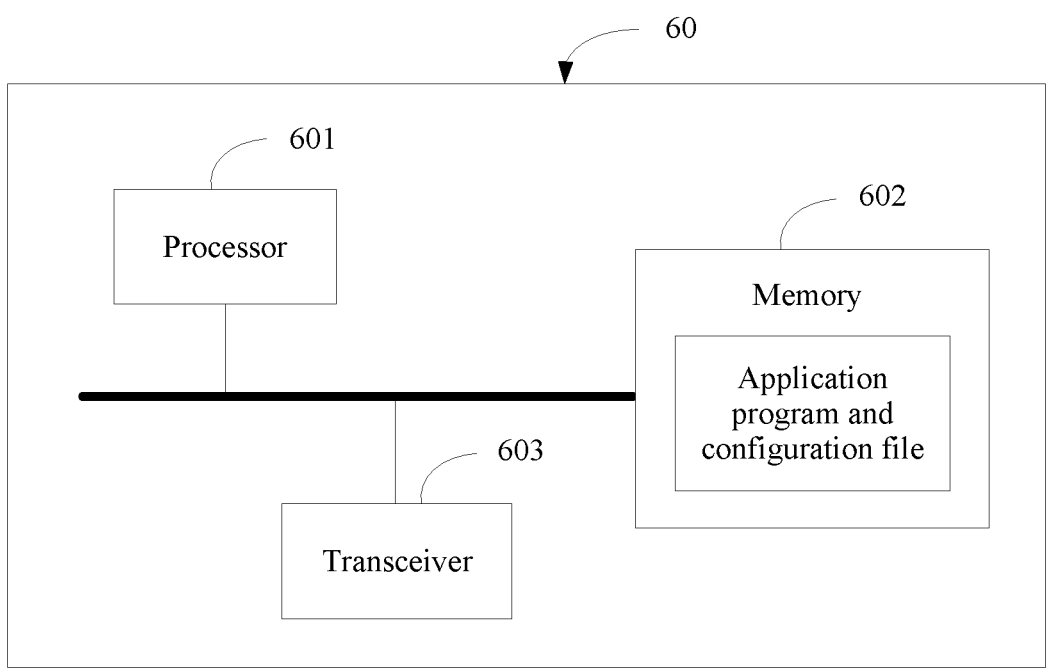
FIG. 6 is a schematic structural diagram of a functional network element 60 according to an embodiment of the present disclosure.

Further, FIG. 6 is a schematic structural diagram of a functional network element 60 related to the embodiments of the present disclosure. The functional network element 60 may be the network interworking service network element deployed in the first network or the second network in FIG. 2 or FIG. 3, and may be separately deployed or may be deployed depending on another network element. The functional network element 60 may be any authentication, authorization, and accounting server, base station, gateway, or security node included in FIG. 1.

As shown in FIG. 6, the functional network element 60 may include a processor 601, a memory 602, and a transceiver 603.

The following describes in detail the components of the functional network element 60 with reference to FIG. 6.

The memory 602 may be a volatile memory, such as a RAM; or a non-volatile memory, such as a ROM, a flash memory, an HDD, or an SSD; or a combination of the foregoing types of memories, configured to store a related application program and configuration file that can implement the method of the present disclosure.

The processor 601 is a control center of the functional network element 60, and may be a CPU, or may be an ASIC, or may be configured as one or more integrated circuits for implementing the embodiments of the present disclosure, for example, one or more DSPs or one or more FPGAs. The processor 601 may run or execute a software program and/or module stored in the memory 602 and invoke data stored in the memory 602, to perform various functions of the functional network element 60.

The transceiver 603 may be a communications port, a communications interface, or the like of the functional network element 60, configured to exchange information or messages with another network element.

The following describes in detail the embodiments of the present disclosure with reference to accompanying drawings.

According to one aspect, an embodiment of the present disclosure provides a network interworking method, applied to the network architecture shown in FIG. 2 or FIG. 3. Interworking between a first network and a second network is implemented by deploying a network interworking configuration network element.

Figure 7:
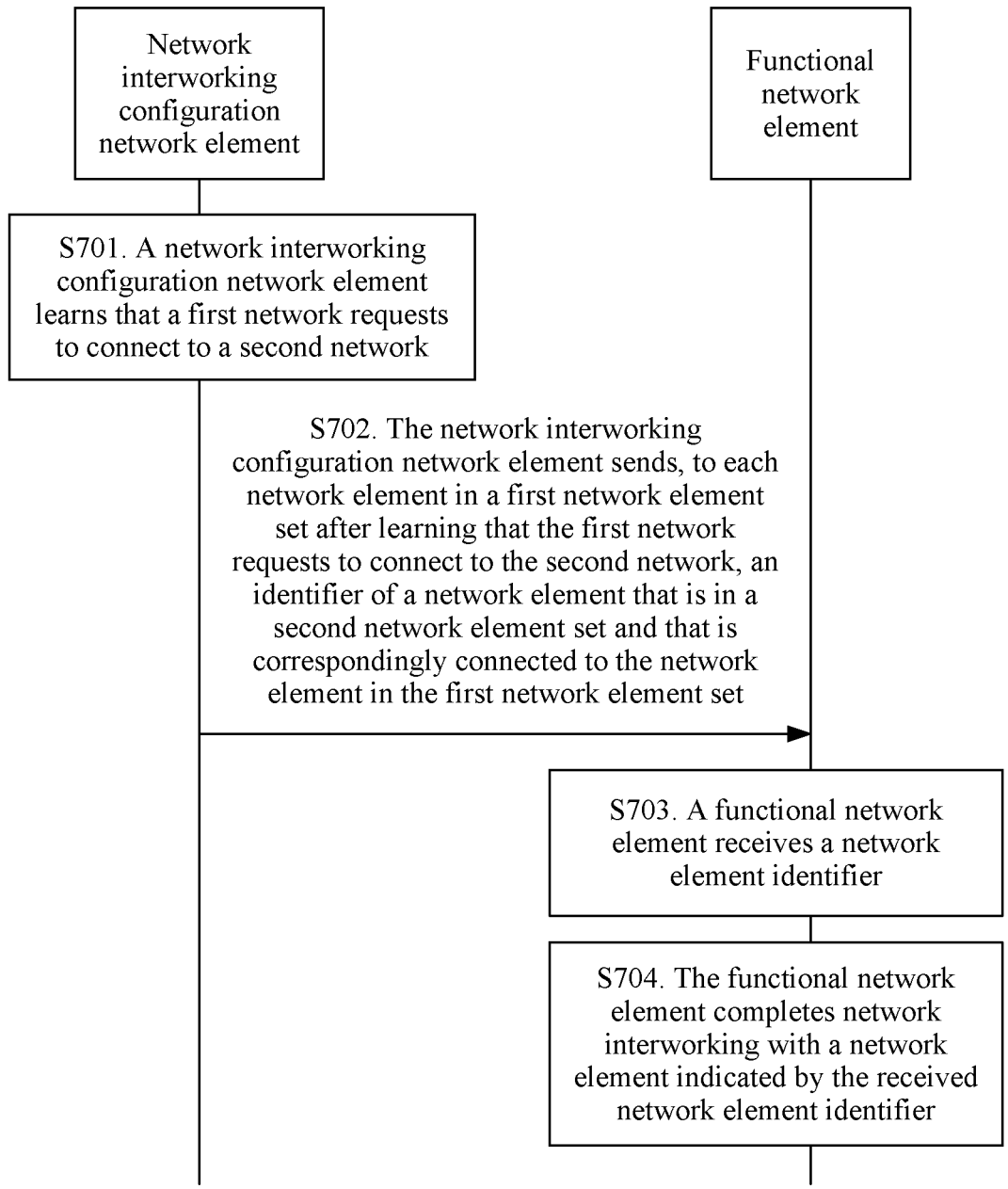
FIG. 7 is a schematic flowchart of a network interworking method according to an embodiment of the present disclosure.

As shown in FIG. 7, the network interworking method provided in this embodiment of the present disclosure may include the following steps.

S701. The network interworking configuration network element learns that the first network requests to connect to the second network.

Specifically, S701 is performed by the processor 401 in the network interworking configuration network element 40 shown in FIG. 4.

Optionally, S701 may be implemented by using either of the following two solutions:

First Solution:

The network interworking configuration network element receives a network interworking request sent by a manager of the first network.

The network interworking request includes an identifier of the first network and an identifier of the second network.

The identifier of the second network is used to reflect an identifier of an operator network with which the first network applies for interworking. In other words, the identifier of the second network is used to indicate the operator network to which the first network is to connect.

Optionally, the manager of the first network may input an identifier of each network element in a first network element set by using a command line, a web page, or an application (APP). Certainly, in this embodiment of the present disclosure, a manner for sending the network interworking request by the manager of the first network is not specifically limited.

Second Solution:

The network interworking configuration network element receives a network interworking request that is sent by a network interworking service network element in the first network and that is used to connect to the second network.

It should be noted that, the network interworking request in the second solution and the network interworking request in the first solution have same content, but are sent by different parties.

Further, the network interworking configuration network element may receive, through an open interface disposed on the network interworking configuration network element, the network interworking request sent by the manager of the first network or the network interworking service network element in the first network.

Further optionally, the network interworking request may further include: an identifier of a network element in the first network element set, an identifier of the first network interworking service network element, a processing manner indication used to indicate that a connection is to be established or a connection is to be deleted, location information of the first network, scale information of the first network, a service feature of the first network, or a performance requirement of the first network.

The first network element set includes a network element that is in the first network and that is connected to the second network.

The location information of the first network may be expressed by using administrative region information or longitude and latitude information, or expressed in another manner. This is not specifically limited in this embodiment of the present disclosure.

The scale information of the first network may be expressed by using an option such as a large-sized network, a medium-sized network, or a small-sized network, or may be expressed by using a quantity of devices in the first network, or expressed in another manner that can express a network scale. This is not specifically limited in this embodiment of the present disclosure, either.

The service feature of the first network is a service implemented by applying the first network. The service feature may include a video service, a voice service, a web page service, or others. Different services may be indicated by using different symbols. A symbol may be a number or a letter. A manner for expressing the service feature of the first network is not specifically limited in this embodiment of the present disclosure.

The performance requirement of the first network may include a delay requirement. The delay requirement reflects a network transmission delay requirement of the first network. The performance requirement of the first network may further include a bandwidth requirement. The bandwidth requirement reflects a network transmission bandwidth requirement of the first network.

It should be noted that, the network element that is in the first network and that is connected to the second network may be some or all functional network elements included in the first network. Specifically, the network element that is in the first network and that is connected to the second network may be defined based on a network configuration requirement or according to a communications technology standard. This is not specifically limited in this embodiment of the present disclosure.

For example, current common network elements in the first network usually include an authentication, authorization, and accounting server in the first network, a gateway in the first network, and a base station in the first network. The first network element set includes some or all functional network elements in the first network. Therefore, the first network element set may include at least one of the following network elements: the authentication, authorization, and accounting server in the first network, the gateway in the first network, and the base station in the first network.

S702. The network interworking configuration network element sends, to each network element in a first network element set after learning that the first network requests to connect to the second network, an identifier of a network element that is in a second network element set and that is correspondingly connected to the network element in the first network element set.

Specifically, S702 is performed by the processor 401 in the network interworking configuration network element 40 shown in FIG. 4 by using the transceiver 403.

After S702 is performed, the network element in the first network element set obtains the identifier of the network element that is in the second network and that is correspondingly connected to the network element in the first network element set. The network element in the first network element set can perform, based on the received network element identifier, network interworking with the network element that is in the second network element set and that is correspondingly connected to the network element in the first network element set.

Specifically, the second network element set includes a network element that is in the second network and that is connected to each network element in the first network element set in one-to-one correspondence.

Optionally, the network element included in the second network element set may be predefined according to a communications protocol or standard. Alternatively, the network element included in the second network element set may be dynamically determined based on the location information of the first network, the scale information of the first network, the service feature of the first network, and the performance requirement of the first network that are included in the network interworking request.

It should be noted that, a specific method for determining the network element included in the second network element set may be implemented based on an actual requirement. This is not specifically limited in this embodiment of the present disclosure.

It should be noted that, a corresponding connection relationship between each network element in the second network element set and the network element in the first network element set may be sent together with an identifier of each network element in the second network element set, or may be a default preset correspondence known to both the network interworking configuration network element and the network interworking service network element. This is not limited in this embodiment of the present disclosure.

Optionally, when the network element that is in the first network and that is connected to the second network includes at least one of the authentication, authorization, and accounting server in the first network, the base station in the first network, or the gateway in the first network, a network element that is in the second network and that is correspondingly connected to the authentication, authorization, and accounting server in the first network includes an authentication, authorization, and accounting server in the second network; a network element that is in the second network and that is correspondingly connected to the gateway in the first network includes a security node in the second network; and a network element that is in the second network and that is correspondingly connected to the base station in the first network includes the authentication, authorization, and accounting server in the second network or the security node in the second network.

It is assumed that the second network includes the authentication, authorization, and accounting server in the second network and the security node in the second network, and the first network includes the authentication, authorization, and accounting server in the first network, the base station in the first network, and the gateway in the first network. A network element combination for interworking between the first network and the second network is described below by using examples.

EXAMPLE 1

The network element that is in the first network and that is connected to the second network is the authentication, authorization, and accounting server in the first network and the gateway in the first network; the network element that is in the second network and that is correspondingly connected to the authentication, authorization, and accounting server in the first network is the authentication, authorization, and accounting server in the second network; and the network element that is in the second network and that is correspondingly connected to the gateway in the first network is the security node in the second network. In S702, the network interworking configuration network element sends an identifier of the authentication, authorization, and accounting server in the second network to the authentication, authorization, and accounting server in the first network, and sends an identifier of the security node in the second network to the gateway in the first network.

EXAMPLE 2

The network element that is in the first network and that is connected to the second network is the authentication, authorization, and accounting server in the first network and the base station in the first network; the network element that is in the second network and that is correspondingly connected to the authentication, authorization, and accounting server in the first network is the authentication, authorization, and accounting server in the second network; and the network element that is in the second network and that is correspondingly connected to the base station in the first network is the security node in the second network. In S702, the network interworking configuration network element sends an identifier of the authentication, authorization, and accounting server in the second network to the authentication, authorization, and accounting server in the first network, and sends an identifier of the security node in the second network to the base station in the first network.

EXAMPLE 3

The network element that is in the first network and that is connected to the second network is the base station in the first network and the gateway in the first network; the network element that is in the second network and that is correspondingly connected to the base station in the first network is the authentication, authorization, and accounting server in the second network; and the network element that is in the second network and that is correspondingly connected to the gateway in the first network is the security node in the second network. In S702, the network interworking configuration network element sends an identifier of the authentication, authorization, and accounting server in the second network to the base station in the first network, and sends an identifier of the security node in the second network to the gateway in the first network.

EXAMPLE 4

The network element that is in the first network and that is connected to the second network is the base station in the first network, and the network element that is in the second network and that is correspondingly connected to the base station in the first network is the authentication, authorization, and accounting server in the second network and the security node in the second network. In S702, the network interworking configuration network element sends identifiers of the authentication, authorization, and accounting server in the second network and the security node in the second network to the base station in the first network.

A network element identifier mentioned in any embodiment of the present disclosure is information that can be used to uniquely identify a network element. A type and specific content of the network element identifier may be determined based on an actual requirement. This is not specifically limited in this embodiment of the present disclosure.

For example, an identifier of a network element may be an Internet Protocol (IP) address of the network element, or a Media Access Control (MAC) address of the network element, or a fully qualified domain name (FQDN). Alternatively, the network element identifier may be a domain name.

Optionally, S702 may be implemented by using either of the following two solutions:

Solution A:

The network interworking configuration network element directly sends, to each network element in the first network element set, the identifier of the network element that is in the second network element set and that is correspondingly connected to the network element in the first network element set.

Specifically, in solution A, when S702 is implemented, the network interworking configuration network element can send, to a network element in the first network element set, an identifier of a network element that is correspondingly connected to the network element in the first network element set.

Solution B:

The network interworking configuration network element sends, to the first network interworking service network element in the first network, an identifier of a network element that is in the second network element set and that is correspondingly connected to each network element in the first network element set, so that the first network interworking service network element sends, to each network element in the first network element set, the identifier of the network element that is in the second network element set and that is correspondingly connected to the network element in the first network element set.

Optionally, when S702 is implemented by using solution B, content sent by the network interworking configuration network element to the first network interworking service network element in the first network includes: the identifier of the network element that is in the second network element set and that is correspondingly connected to each network element in the first network element set, and a connection relationship between network elements.

Optionally, when S702 is implemented by using solution B, a connection relationship between network elements is preset in the first network interworking service network element, and content sent by the network interworking configuration network element to the first network interworking service network element in the first network includes the identifier of the network element that is in the second network element set and that is correspondingly connected to each network element in the first network element set.

Specifically, if S702 is implemented by using solution B, the method further includes S7021 to S7023. Then, S702 is replaced with S7021 to S7023 in FIG. 8A to FIG. 8C for implementation.

S7021. The network interworking configuration network element sends, to a first network interworking service network element in the first network, an identifier of a network element that is in the second network element set and that is correspondingly connected to each network element in the first network element set.

S7022. The first network interworking service network element receives the identifier, sent by the network interworking configuration network element, of the network element that is in the second network element set and that is correspondingly connected to each network element in the first network element set.

S7023. The first network interworking service network element sends, to each network element in the first network element set, the identifier of the network element that is in the second network element set and that is correspondingly connected to the network element in the first network element set.

Corresponding to the foregoing four examples, the following describes an example process of performing S7023.

Corresponding to example 1, when S7023 is performed, the network interworking service network element in the first network sends the identifier of the authentication, authorization, and accounting server in the second network to the authentication, authorization, and accounting server in the first network, and sends the identifier of the security node in the second network to the gateway in the first network.

Corresponding to example 2, when S7023 is performed, the network interworking service network element in the first network sends the identifier of the authentication, authorization, and accounting server in the second network to the authentication, authorization, and accounting server in the first network, and sends the identifier of the security node in the second network to the base station in the first network.

Corresponding to example 3, when S7023 is performed, the network interworking service network element in the first network sends the identifier of the authentication, authorization, and accounting server in the second network to the base station in the first network, and sends the identifier of the security node in the second network to the gateway in the first network.

Corresponding to example 4, when S7023 is performed, the network interworking service network element in the first network sends the identifiers of the authentication, authorization, and accounting server and the security node in the second network to the base station in the first network.

Optionally, in S7023, the first network interworking service network element in the first network may send, to each network element in the first network element set by using either of the following two solutions, the identifier of the network element that is in the second network element set and that is correspondingly connected to the network element in the first network element set:

Solution 1:

The first network interworking service network element directly sends, to each network element in the first network element set, the identifier of the network element that is in the second network element set and that is correspondingly connected to the network element in the first network element set.

Corresponding to example 1, when S7023 is performed, if solution 1 is used, the first network interworking service network element directly sends the identifier of the authentication, authorization, and accounting server in the second network to the authentication, authorization, and accounting server in the first network, and directly sends the identifier of the security node in the second network to the gateway in the first network.

Solution 2:

The first network interworking service network element sends, to a first network element in the first network element set, the identifier of the network element that is in the second network element set and that is correspondingly connected to each network element in the first network element set; and the first network element forwards, to another network element in the first network element set, an identifier of a network element that is in the second network element set and that is connected to the another network element.

The first network element may be any network element in the first network element set, or may be a network element that is in the first network element set and that is closest to the network interworking service network element in the first network.

Corresponding to example 1, when S7023 is performed, if solution 2 is used, the first network interworking service network element sends the identifier of the authentication, authorization, and accounting server in the second network and the identifier of the security node in the second network to the authentication, authorization, and accounting server in the first network, and the authentication, authorization, and accounting server in the first network sends the identifier of the security node in the second network to the gateway in the first network.

It should be noted that, a solution for implementing S7023 is not limited to only the foregoing two solutions, and any solution that may be used by the first network interworking service network element to send, to each network element in the first network element set, the identifier of the network element that is in the second network element set and that is connected to the network element in the first network element set falls within the protection scope of the present disclosure.

S703. A functional network element receives a network element identifier.

Specifically, S703 may be performed by the processor 601 in the functional network element 60 shown in FIG. 6 by using the transceiver 603.

The functional network element is a functional network element in the first network or the second network. The received network element identifier is an identifier of a network element that is in a network to which a network to which the functional network element belongs requests to connect and that is correspondingly connected to the functional network element.

Optionally, the functional network element includes any one of the following network elements: the authentication, authorization, and accounting server in the first network, the gateway in the first network, the base station in the first network, the authentication, authorization, and accounting server in the second network, and the security node in the second network.

S704. The functional network element completes network interworking with a network element indicated by the received network element identifier.

Specifically, S704 may be performed by the processor 601 in the functional network element 60 shown in FIG. 6 by using the transceiver 603.

Optionally, if the functional network element belongs to the first network, the completing network interworking with a network element indicated by the received network element identifier is implemented as: sending a connection request to the network element indicated by the received network element identifier. If the functional network element belongs to the second network, the completing network interworking with a network element indicated by the received network element identifier is implemented as: receiving a connection request sent by the network element indicated by the network element identifier, and responding to the request to complete network interworking.

Specifically, a specific operation of S704 is the same as a current technology, and is briefly described as follows:

Each network element in the first network element set initiates a connection establishment request based on the obtained identifier to request establishment of a connection. When each network element in the second network element set receives an establishment request, after verifying a network element that sends the establishment request and that is correspondingly connected to the network element in the second network element set, the network element in the second network element set responds to or rejects the request. In this way, interworking between the two networks is completed.

In this way, when learning that the first network requests to connect to the second network, the network interworking configuration network element feeds back, to the network element that is in the first network and that is connected to the second network, an identifier of a network element that is in the second network and that is correspondingly connected to the network element in the first network for network interworking, so that the network element in the first network can complete interworking between the first network and the second network based on the received identifier. In the network interworking process, when learning that network interworking is requested, the network interworking configuration network element automatically delivers a network element identifier for network interworking, thereby avoiding a process of manually registering information to trigger a network interworking procedure during interworking between two networks, and improving network interworking efficiency.

Figure 8B:
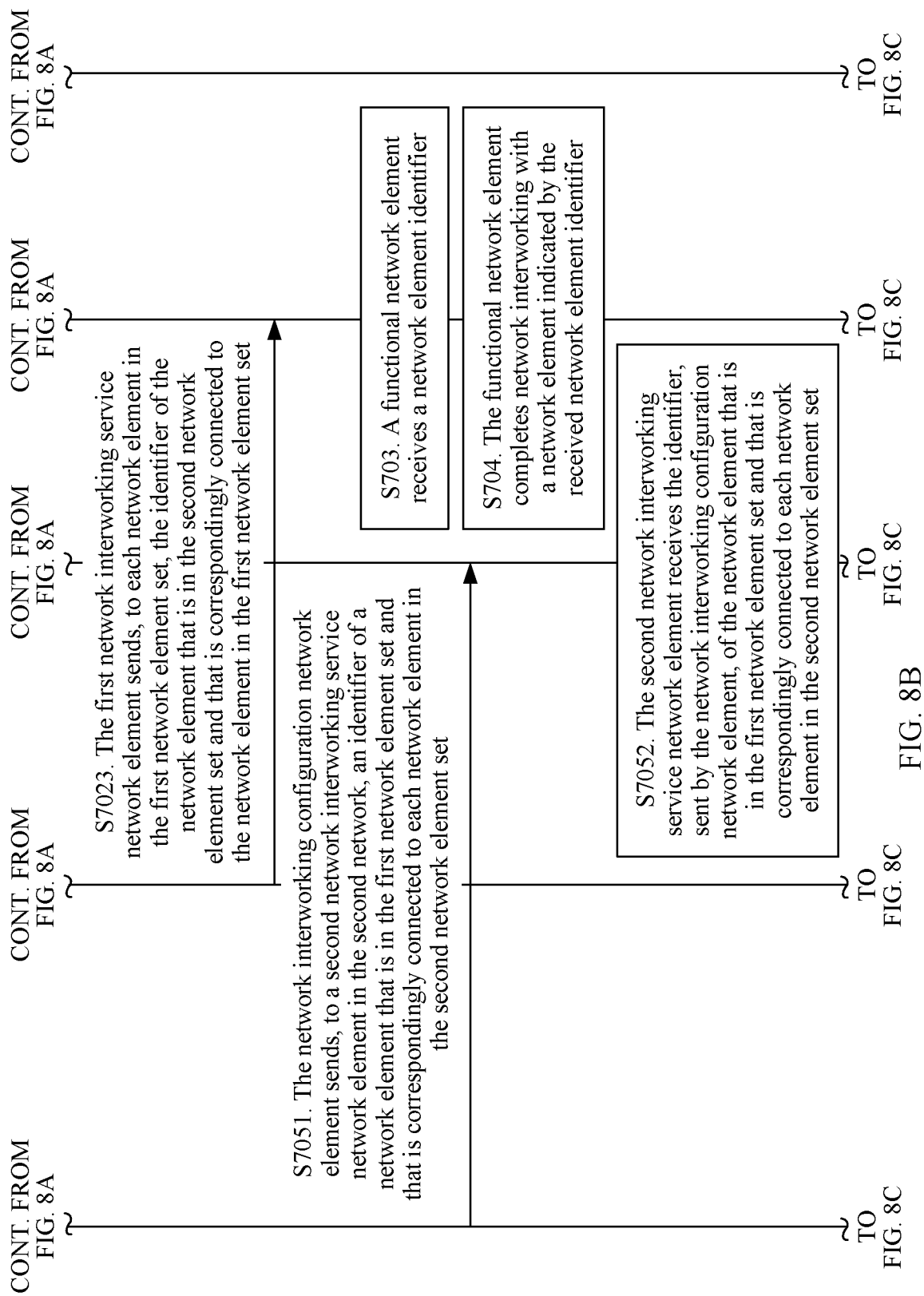

Further, as shown in FIG. 8A to FIG. 8C, after S701, the method may further include:

sending, by the network interworking configuration network element to each network element in the second network element set, an identifier of a network element that is in the first network element set and that is correspondingly connected to the network element in the second network element set.

Specifically, the sending, by the network interworking configuration network element to each network element in the second network element set, an identifier of a network element that is in the first network element set and that is correspondingly connected to the network element in the second network element set is performed by the processor 401 in the network interworking configuration network element 40 shown in FIG. 4 by using the transceiver 403.

After the network interworking configuration network element sends, to each network element in the second network element set, an identifier of a network element that is in the first network element set and that is correspondingly connected to the network element in the second network element set, the network element in the second network element set obtains the identifier of the network element that is in the first network and that is correspondingly connected to the network element in the second network element set. When the network element in the second network element set receives a connection request sent by the network element that is in the first network element set and that is correspondingly connected to the network element in the second network element set, the network element in the second network element set can perform, based on the received network element identifier, network interworking with the network element that is in the first network element set and that is correspondingly connected to the network element in the second network element set.

Optionally, the network interworking configuration network element may send, to each network element in the second network element set by using either of the following two solutions, the identifier of the network element that is in the first network element set and that is correspondingly connected to the network element in the second network element set.

Solution A:

The network interworking configuration network element directly sends, to each network element in the second network element set, the identifier of the network element that is in the first network element set and that is correspondingly connected to the network element in the second network element set.

Specifically, in solution a, the network interworking configuration network element can send, to a network element in the second network element set, an identifier of a network element that is correspondingly connected to the network element in the second network element set.

Solution B:

The network interworking configuration network element sends, to a second network interworking service network element in the second network, an identifier of a network element that is in the first network element set and that is correspondingly connected to each network element in the second network element set, so that the second network interworking service network element sends, to each network element in the second network element set, the identifier of the network element that is in the first network element set and that is correspondingly connected to the network element in the second network element set.

Optionally, in solution B, content sent by the network interworking configuration network element to the second network interworking service network element in the second network includes: the identifier of the network element that is in the first network element set and that is correspondingly connected to each network element in the second network element set, and a connection relationship between network elements.

Optionally, in solution B, a connection relationship between network elements is preset in the second network interworking service network element, and content sent by the network interworking configuration network element to the second network interworking service network element in the second network includes the identifier of the network element that is in the first network element set and that is correspondingly connected to each network element in the second network element set.

Specifically, if the network interworking configuration network element sends, to each network element in the second network element set by using solution b, the identifier of the network element that is in the first network element set and that is correspondingly connected to the network element in the second network element set, the method further includes S7051 to S7053. Then, S705 is marked as S7051 to S7053 in FIG. 8A to FIG. 8C for implementation.

S7051. The network interworking configuration network element sends, to a second network interworking service network element in the second network, an identifier of a network element that is in the first network element set and that is correspondingly connected to each network element in the second network element set.

S7052. The second network interworking service network element receives the identifier, sent by the network interworking configuration network element, of the network element that is in the first network element set and that is correspondingly connected to each network element in the second network element set.

S7053. The second network interworking service network element sends, to each network element in the second network element set, the identifier of the network element that is in the first network element set and that is correspondingly connected to the network element in the second network element set.

Corresponding to the foregoing four examples, the following describes an example process of performing S7053.

Corresponding to example 1, when S7053 is performed, the second network interworking service network element sends an identifier of the authentication, authorization, and accounting server in the first network to the authentication, authorization, and accounting server in the second network, and sends an identifier of the gateway in the first network to the security node in the second network.

Corresponding to example 2, when S7053 is performed, the second network interworking service network element sends an identifier of the authentication, authorization, and accounting server in the first network to the authentication, authorization, and accounting server in the second network, and sends an identifier of the base station in the first network to the security node in the second network.

Corresponding to example 3, when S7053 is performed, the second network interworking service network element sends an identifier of the base station in the first network to the authentication, authorization, and accounting server in the second network, and sends an identifier of the gateway in the first network to the security node in the second network.

Corresponding to example 4, when S7053 is performed, the second network interworking service network element sends an identifier of the base station in the first network to the authentication, authorization, and accounting server and the security node in the second network.

Optionally, in S7053, the second network interworking service network element in the second network may send, to each network element in the second network element set by using either of the following two solutions, the identifier of the network element that is in the first network element set and that is correspondingly connected to the network element in the second network element set:

Solution 1:

The second network interworking service network element directly sends, to each network element in the second network element set, the identifier of the network element that is in the first network element set and that is correspondingly connected to the network element in the second network element set.

Corresponding to example 1, when S7053 is performed, if solution 1 is used, the second network interworking service network element directly sends the identifier of the authentication, authorization, and accounting server in the first network to the authentication, authorization, and accounting server in the second network, and directly sends the identifier of the gateway in the first network to the security node in the second network.

Solution 2:

The second network interworking service network element sends, to a second network element in the second network element set, the identifier of the network element that is in the first network element set and that is correspondingly connected to each network element in the second network element set; and the second network element forwards, to another network element in the second network element set, an identifier of a network element that is in the first network element set and that is connected to the another network element.

The second network element may be any network element in the second network element set, or may be a network element that is in the second network element set and that is closest to the second network interworking service network element in the second network.

Corresponding to example 1, when S7053 is performed, if solution 2 is used, the second network interworking service network element sends the identifier of the authentication, authorization, and accounting server in the first network and the identifier of the gateway in the first network to the authentication, authorization, and accounting server in the second network, and the authentication, authorization, and accounting server in the second network sends the identifier of the gateway in the first network to the security node in the second network.

It should be noted that, a solution for implementing S7053 is not limited to only the foregoing two solutions, and any solution that may be used by the second network interworking service network element to send, to each network element in the second network element set, the identifier of the network element that is in the first network element set and that is correspondingly connected to the network element in the second network element set falls within the protection scope of the present disclosure.

It should be noted that, S705 is performed after S701, and S705 and S702 may be simultaneously performed or may be performed in sequence. When S705 and S702 are performed in sequence, a specific sequence may be determined based on an actual requirement. This is not specifically limited in this embodiment of the present disclosure.

Further optionally, S702 may be specifically implemented as: after learning that the first network requests to connect to the second network, if verifying that the first network is allowed to access the second network, sending, to each network element in the first network element set, the identifier of the network element that is in the second network element set and that is correspondingly connected to the network element in the first network element set.

Specifically, there may be a plurality of implementations for verifying that the first network is allowed to access the second network. A specific implementation is not limited in this embodiment of the present disclosure. The following provides two specific solutions for verifying that the first network is allowed to access the second network, but does not specifically limit an implementation solution.

Optionally, the implementation solution for the network interworking configuration network element to verify that the first network is allowed to access the second network may include, but is not limited to, the following two implementation solutions:

First implementation solution:

The network interworking configuration network element outputs a verification indication to a manager of the second network. If an indication that is input by the manager and indicates that the first network is allowed to access the second network is received, it is verified that the first network is allowed to access the second network.

Optionally, in the first implementation solution, the network interworking configuration network element may output the verification indication to the manager of the second network through presentation in an interaction interface. Alternatively, the network interworking configuration network element may output the verification indication to the manager of the second network by sending an SMS message to the manager of the second network. Alternatively, the network interworking configuration network element outputs the verification indication to the manager of the second network in another manner. A manner for outputting the verification indication to the manager of the second network by the network interworking configuration network element is not specifically limited in this embodiment of the present disclosure.

Optionally, the verification indication may include the network interworking request or other information that is used by the manager to determine whether the first network can access the second network.

It should be noted that, the verification indication that is output by the network interworking configuration network element to the manager of the second network may be original content in the network interworking request, or content that is in the network interworking request and obtained after conversion based on a network requirement. This is not specifically limited in this embodiment of the present disclosure.

Further, the network interworking configuration network element outputs the verification indication to the manager of the second network, the manager of the second network manually verifies whether the first network is allowed to access the second network, and the manager inputs a verification result. The result is an indication indicating whether the first network is allowed to access the second network.

It should be noted that, a rule and a process for the manager of the second network to manually verify whether the first network is allowed to access the second network are not specifically limited in this embodiment of the present disclosure.

Second implementation solution:

If the first network meets a preset rule, it is verified that the first network is allowed to access the second network.

Optionally, that the first network meets a preset rule includes that content included in the network interworking request meets a preset rule, or a parameter of the first network meets a preset rule, or certainly may be that other information meets a preset rule. This is not specifically limited in this embodiment of the present disclosure.

It should be noted that, content of the preset rule may be configured based on an actual requirement. This is not specifically limited in this embodiment of the present disclosure.

For example, the preset rule may be at least one of the following conditions: a preset identifier of a first network, a preset set of identifiers of second networks, a preset set of identifiers of network interworking service network elements, an indication of an acceptable processing manner, a preset location requirement on a first network whose access is allowed, it is preset that a scale of a first network whose access is allowed is greater than a preset threshold, it is preset that the service feature of the first network needs to be higher than preset performance, and it is preset that a performance requirement of the first network is lower than a preset requirement. Preset content (including an identifier, a threshold, performance, a requirement, or the like) may be configured based on an actual requirement. This is not specifically limited in this embodiment of the present disclosure.

It should be noted that, the foregoing examples are merely intended to describe the preset rule by using examples, and do not specifically limit the content of the preset rule.

The foregoing has mainly described the solutions provided in the embodiments of the present disclosure from a perspective of interaction between network elements. It may be understood that, to implement the foregoing functions, each network element such as the network interworking service network element or the network interworking configuration network element includes a corresponding hardware structure and/or software module for performing functions. Persons of ordinary skill in the art should be easily aware that, the units and algorithm steps in the examples described with reference to the embodiments disclosed in this specification may be implemented by hardware or a combination of hardware and computer software. Whether a function is performed by hardware or by computer software by driving hardware depends on particular applications and design constraint conditions of the technical solutions. Persons skilled in the art may use different methods to implement the described functions for each particular application, but it should not be considered that the implementation goes beyond the scope of the present disclosure.

In the embodiments of the present disclosure, the network interworking configuration network element, the network interworking service network element, the functional network element, and the like may be divided into functional modules based on the foregoing method example. For example, each functional module may be obtained through division based on each corresponding function, or two or more functions may be integrated into one processing module. The integrated module may be implemented in a form of hardware, or may be implemented in a form of a software functional module. It should be noted that, the module division in the embodiments of the present disclosure is an example, and is merely logical function division. There may be another division manner in an actual implementation.

It should be noted that, in the foregoing network interworking method, the network interworking configuration network element, the first network interworking service network element, the second network interworking service network element, and the like each may be an integral device, or may be a device constructed by a plurality of functional devices. This is not specifically limited in the embodiments of the present disclosure. Regardless of being integrally deployed or being deployed as distributed modules, any network element that implements the foregoing functions falls within the protection scope of the present disclosure.

For example, functions of the network interworking configuration network element may be completed by a combination of a plurality of devices. For example, a device 1 receives the network interworking request to learn that the first network requests to connect to the second network, a device 2 selects a network element to determine the second network element set, and a device 3 sends an identifier to a network element in the first/second network element set. The devices 1, 2, and 3 cooperate to implement the functions of the network interworking configuration network element.

Figure 9:
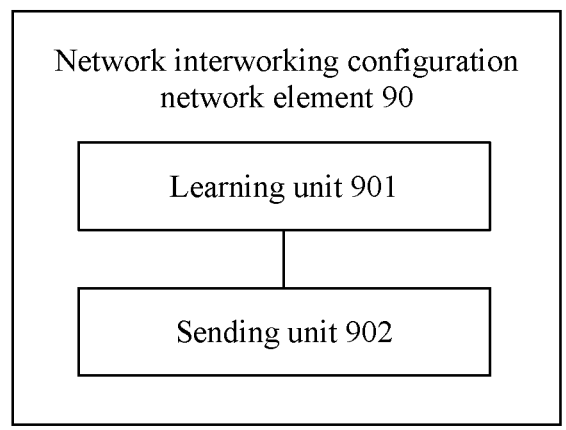
FIG. 9 is a schematic structural diagram of a network interworking configuration network element 90 according to an embodiment of the present disclosure.

When each functional module is obtained through division based on each corresponding function, FIG. 9 is a possible schematic structural diagram of a network interworking configuration network element 90 related to the foregoing embodiment. The network interworking configuration network element 90 includes a learning unit 901 and a sending unit 902. The learning unit 901 is configured to support the network interworking configuration network element 90 in performing process S701 in FIG. 7 or FIG. 8A to FIG. 8C. The sending unit 902 is configured to support the network interworking configuration network element 90 in performing steps S702 and S705 in FIG. 7 or steps S7021 and S7051 in FIG. 8A to FIG. 8C. All related content of each step in the foregoing method embodiment may be cited in function descriptions of a corresponding functional module. Details are not described herein again.

Figure 10:
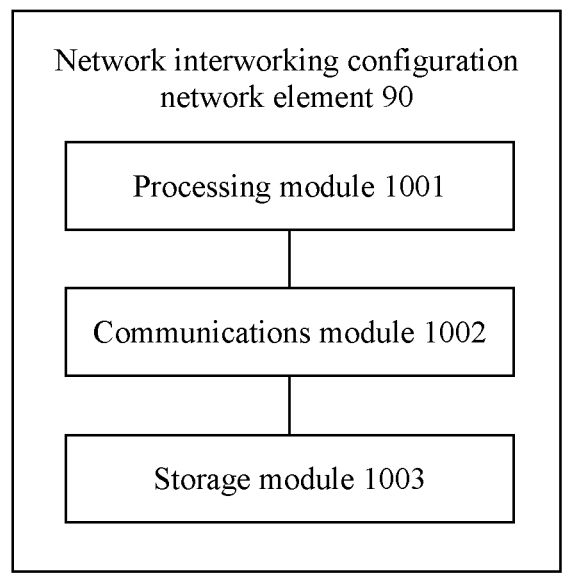
FIG. 10 is a schematic structural diagram of another network interworking configuration network element 90 according to an embodiment of the present disclosure.

When an integrated unit is used, FIG. 10 is a possible schematic structural diagram of a network interworking configuration network element 90 related to the foregoing embodiment. The network interworking configuration network element 90 may include a processing module 1001 and a communications module 1002. The processing module 1001 is configured to control and manage an action of the network interworking configuration network element 90. For example, the processing module 1001 is configured to support the network interworking configuration network element 90 in performing step S701 in FIG. 7 or FIG. 8A to FIG. 8C; and the processing module 1001 is further configured to support the network interworking configuration network element 90 in performing steps S702 and S705 in FIG. 7 or steps S7021 and S7051 in FIG. 8A to FIG. 8C by using the communications module 1002. The communications module 1002 is configured to support communication between the network interworking configuration network element 90 and another network entity. The network interworking configuration network element 90 may further include a storage module 1003, configured to store program code and data of the network interworking configuration network element 90.

The processing module 1001 may be the processor 401 in the physical structure of the network interworking configuration network element 40 shown in FIG. 4, and may be a processor or a controller, for example, may be a CPU, a general purpose processor, a DSP, an ASIC, an FPGA or another programmable logic device, a transistor logic device, a hardware component, or any combination thereof. The processor or the controller may implement or execute various examples of logical blocks, modules, and circuits that are described with reference to the content disclosed in the present disclosure. The processor may alternatively be a combination for implementing a computing function, for example, a combination of one or more microprocessors or a combination of a DSP and a microprocessor. The communications module 1002 may be the transceiver in the physical structure of the network interworking configuration network element 40 shown in FIG. 4, or may be a transceiver circuit, a communications interface, or the like. The storage module 1003 may be the memory in the physical structure of the network interworking configuration network element 40 shown in FIG. 4.

When the processing module 1001 is the processor, the communications module 1002 is the transceiver, and the storage module 1003 is the memory, the network interworking configuration network element 90 in FIG. 10 in the embodiments of the present disclosure may be the network interworking configuration network element 40 shown in FIG. 4.

Figure 11:
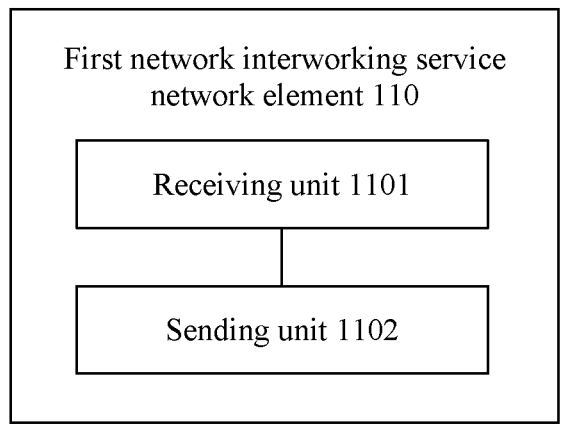
FIG. 11 is a schematic structural diagram of a first network interworking service network element 110 according to an embodiment of the present disclosure.

When each functional module is obtained through division based on each corresponding function, FIG. 11 is a possible schematic structural diagram of a first network interworking service network element 110 related to the foregoing embodiment. The first network interworking service network element 110 includes a receiving unit 1101 and a sending unit 1102. The receiving unit 1101 is configured to support the first network interworking service network element 110 in performing step S7022 in FIG. 8A to FIG. 8C. The sending unit 1102 is configured to support the first network interworking service network element 110 in performing step S7023 in FIG. 8A to FIG. 8C. All related content of each step in the foregoing method embodiment may be cited in function descriptions of a corresponding functional module. Details are not described herein again.

Figure 12:
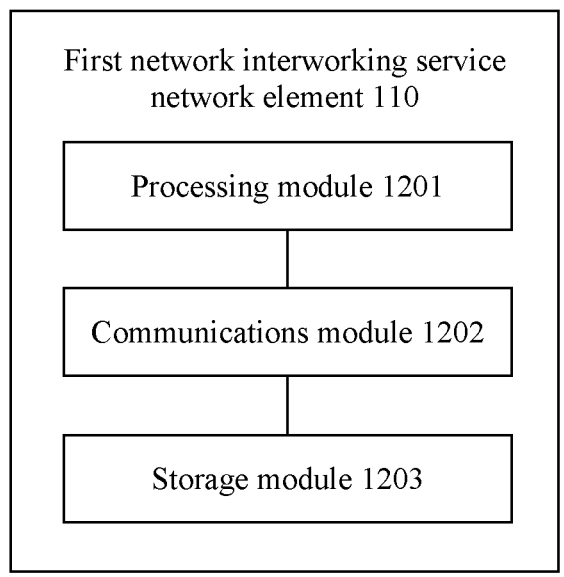
FIG. 12 is a schematic structural diagram of another first network interworking service network element 110 according to an embodiment of the present disclosure.

When an integrated unit is used, FIG. 12 is a possible schematic structural diagram of a first network interworking service network element 110 related to the foregoing embodiment. The first network interworking service network element 110 may include a processing module 1201 and a communications module 1202. The processing module 1201 is configured to control and manage an action of the first network interworking service network element 110. For example, the processing module 1201 is configured to support the first network interworking service network element 110 in performing steps S7022 and S7023 in FIG. 8A to FIG. 8C by using the communications module 1202. The communications module 1202 is configured to support communication between the first network interworking service network element 110 and another network entity. The first network interworking service network element 110 may further include a storage module 1203, configured to store program code and data of the first network interworking service network element 110.

The processing module 1201 may be the processor 501 in the physical structure of the network interworking service network element 50 shown in FIG. 5, and may be a processor or a controller, for example, may be a CPU, a general purpose processor, a DSP, an ASIC, an FPGA or another programmable logic device, a transistor logic device, a hardware component, or any combination thereof. The processor or the controller may implement or execute various examples of logical blocks, modules, and circuits that are described with reference to the content disclosed in the present disclosure. The processor may alternatively be a combination for implementing a computing function, for example, a combination of one or more microprocessors or a combination of a DSP and a microprocessor. The communications module 1202 may be the transceiver in the physical structure of the network interworking service network element 50 shown in FIG. 5, or may be a transceiver circuit, a communications interface, or the like. The storage module 1203 may be the memory in the physical structure of the network interworking service network element 50 shown in FIG. 5.

When the processing module 1201 is the processor, the communications module 1202 is the transceiver, and the storage module 1203 is the memory, the first network interworking service network element 110 used in FIG. 12 in the embodiments of the present disclosure may be the network interworking service network element 50 shown in FIG. 5.

Figure 13:
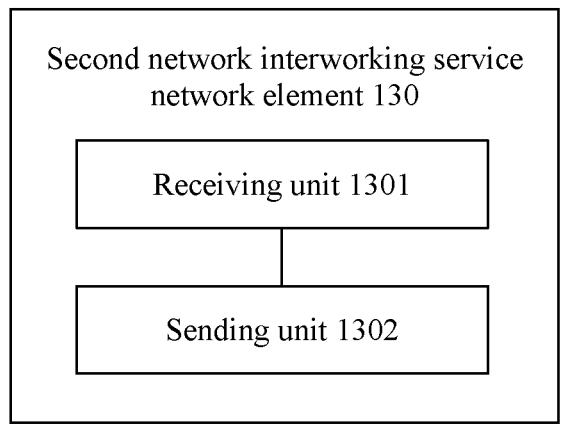
FIG. 13 is a schematic structural diagram of a second network interworking service network element 130 according to an embodiment of the present disclosure.

When each functional module is obtained through division based on each corresponding function, FIG. 13 is a possible schematic structural diagram of a second network interworking service network element 130 related to the foregoing embodiment. The second network interworking service network element 130 includes a receiving unit 1301 and a sending unit 1302. The receiving unit 1301 is configured to support the second network interworking service network element 130 in performing step S7052 in FIG. 8A to FIG. 8C. The sending unit 1302 is configured to support the second network interworking service network element 130 in performing step S7053 in FIG. 8A to FIG. 8C. All related content of each step in the foregoing method embodiment may be cited in function descriptions of a corresponding functional module. Details are not described herein again.

Figure 14:
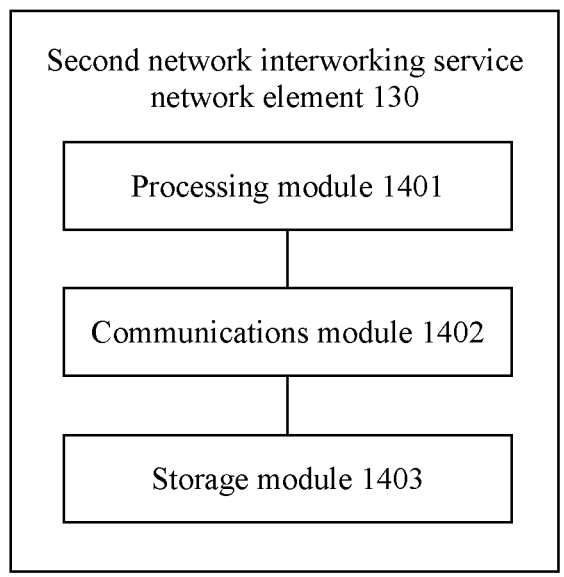
FIG. 14 is a schematic structural diagram of another second network interworking service network element 130 according to an embodiment of the present disclosure.

When an integrated unit is used, FIG. 14 is a possible schematic structural diagram of a second network interworking service network element 130 related to the foregoing embodiment. The second network interworking service network element 130 may include a processing module 1401 and a communications module 1402. The processing module 1401 is configured to control and manage an action of the second network interworking service network element 130. For example, the processing module 1401 is configured to support the second network interworking service network element 130 in performing steps S7052 and S7053 in FIG. 8A to FIG. 8C by using the communications module 1402. The communications module 1402 is configured to support communication between the second network interworking service network element 130 and another network entity. The second network interworking service network element 130 may further include a storage module 1403, configured to store program code and data of the second network interworking service network element 130.

The processing module 1401 may be the processor 501 in the physical structure of the network interworking service network element 50 shown in FIG. 5, and may be a processor or a controller, for example, may be a CPU, a general purpose processor, a DSP, an ASIC, an FPGA or another programmable logic device, a transistor logic device, a hardware component, or any combination thereof. The processor or the controller may implement or execute various examples of logical blocks, modules, and circuits that are described with reference to the content disclosed in the present disclosure. The processor may alternatively be a combination for implementing a computing function, for example, a combination of one or more microprocessors or a combination of a DSP and a microprocessor. The communications module 1402 may be the transceiver in the physical structure of the network interworking service network element 50 shown in FIG. 5, or may be a transceiver circuit, a communications interface, or the like. The storage module 1403 may be the memory in the physical structure of the network interworking service network element 50 shown in FIG. 5.

When the processing module 1401 is the processor, the communications module 1402 is the transceiver, and the storage module 1403 is the memory, the second network interworking service network element 130 used in FIG. 14 in the embodiments of the present disclosure may be the network interworking service network element 50 shown in FIG. 5.

Figure 15:
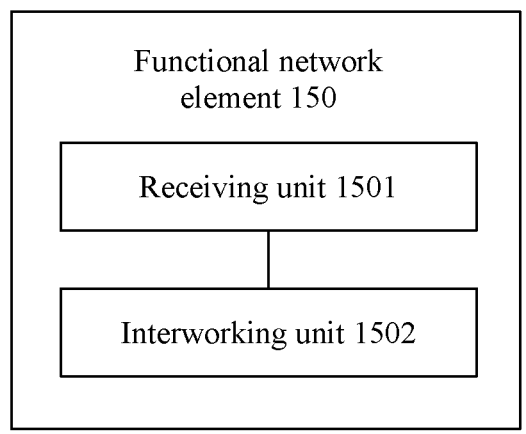
FIG. 15 is a schematic structural diagram of a functional network element 150 according to an embodiment of the present disclosure.

When each functional module is obtained through division based on each corresponding function, FIG. 15 is a possible schematic structural diagram of a functional network element 150 related to the foregoing embodiment. The functional network element 150 includes a receiving unit 1501 and an interworking unit 1502. The receiving unit 1501 is configured to support the functional network element 150 in performing step S703 in FIG. 7 or FIG. 8A to FIG. 8C. The interworking unit 1502 is configured to support the functional network element 150 in performing step S704 in FIG. 7 or FIG. 8A to FIG. 8C. All related content of each step in the foregoing method embodiment may be cited in function descriptions of a corresponding functional module. Details are not described herein again.

Figure 16:
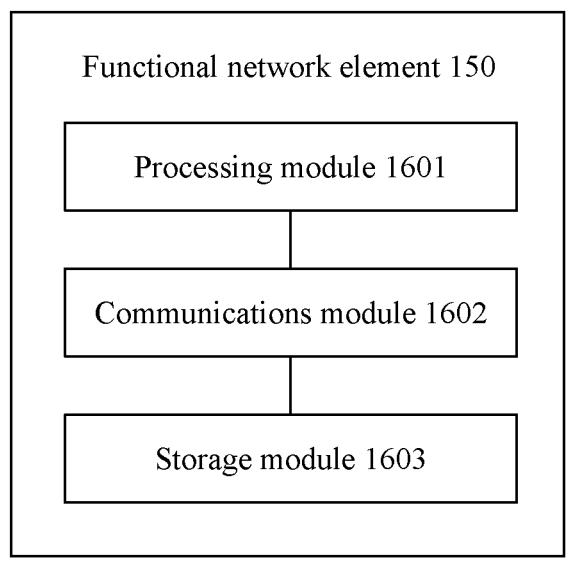
FIG. 16 is a schematic structural diagram of another functional network element 150 according to an embodiment of the present disclosure.

When an integrated unit is used, FIG. 16 is a possible schematic structural diagram of a functional network element 150 related to the foregoing embodiment. The functional network element 150 may include a processing module 1601 and a communications module 1602. The processing module 1601 is configured to control and manage an action of the functional network element 150. For example, the processing module 1601 is configured to support the functional network element 150 in performing steps S703 and S704 in FIG. 7 or FIG. 8A to FIG. 8C by using the communications module 1602. The communications module 1602 is configured to support communication between the functional network element 150 and another network entity. The functional network element 150 may further include a storage module 1603, configured to store program code and data of the functional network element 150.

The processing module 1601 may be the processor 601 in the physical structure of the functional network element 60 shown in FIG. 6, and may be a processor or a controller, for example, may be a CPU, a general purpose processor, a DSP, an ASIC, an FPGA or another programmable logic device, a transistor logic device, a hardware component, or any combination thereof. The processor or the controller may implement or execute various examples of logical blocks, modules, and circuits that are described with reference to the content disclosed in the present disclosure. The processor may alternatively be a combination for implementing a computing function, for example, a combination of one or more microprocessors or a combination of a DSP and a microprocessor. The communications module 1602 may be the transceiver in the physical structure of the functional network element 60 shown in FIG. 6, or may be a transceiver circuit, a communications interface, or the like. The storage module 1603 may be the memory in the physical structure of the functional network element 60 shown in FIG. 6.

When the processing module 1601 is the processor, the communications module 1602 is the transceiver, and the storage module 1603 is the memory, the functional network element 150 in FIG. 16 in the embodiments of the present disclosure may be the functional network element 60 shown in FIG. 6.

The methods or algorithm steps described with reference to the content disclosed in the present disclosure may be implemented by hardware, or may be implemented by a processor by executing a software instruction. The software instruction may include a corresponding software module. The software module may be stored in a RAM, a flash memory, a ROM, an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a core network interface device. Certainly, the processor and the storage medium may exist in the device as discrete components.

Figure 17:
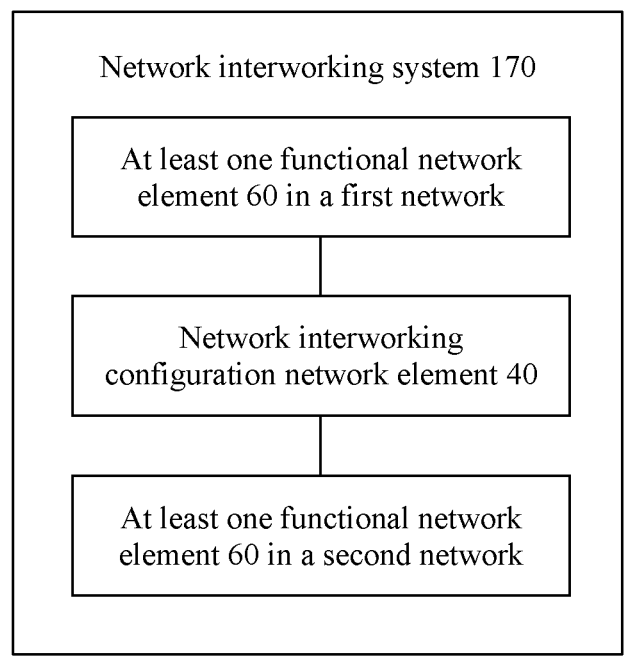
FIG. 17 is a schematic structural diagram of a network interworking system according to an embodiment of the present disclosure.

According to another aspect, an embodiment of the present disclosure provides a network interworking system 170. As shown in FIG. 17, the network interworking system 170 may include:

the network interworking configuration network element 40 in any embodiment above, at least one functional network element 60 in a first network in any embodiment above, and at least one functional network element 60 in a second network in any embodiment above.

Figure 18:
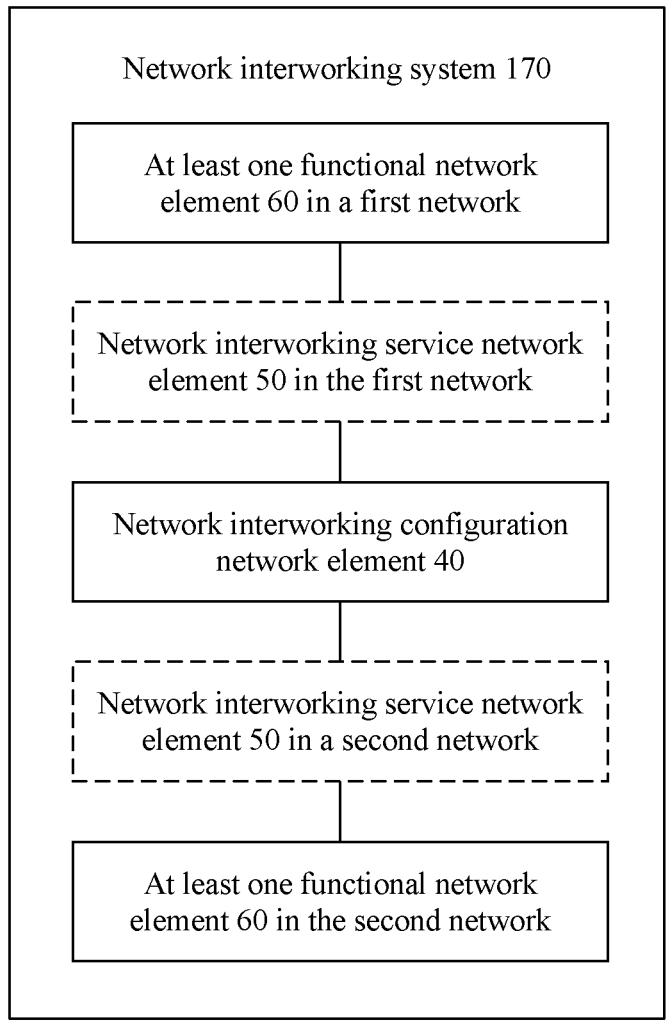
FIG. 18 is a schematic structural diagram of another network interworking system according to an embodiment of the present disclosure.

Further, as shown in FIG. 18, the network interworking system 170 may further include the network interworking service network element 50 in any embodiment above. The network interworking service network element 50 may be deployed only in the first network, or deployed only in the second network, or deployed in both the first network and the second network.

Figure 19:
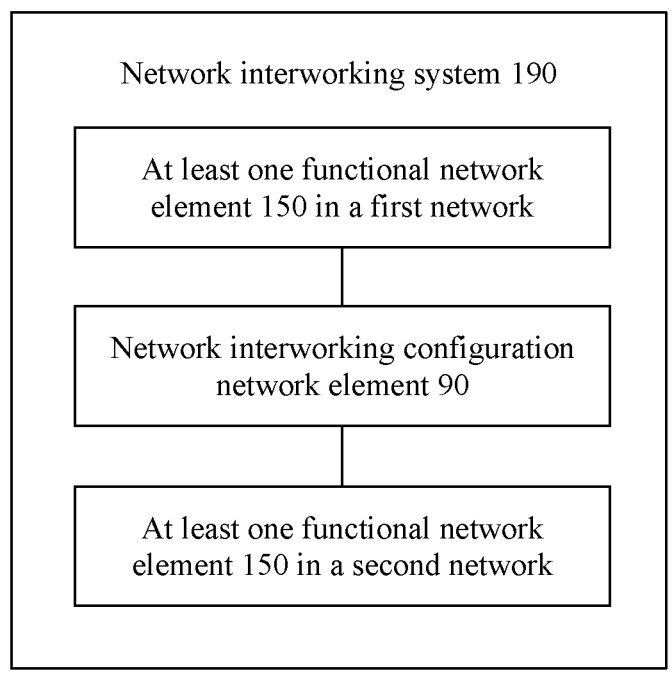
FIG. 19 is a schematic structural diagram of still another network interworking system according to an embodiment of the present disclosure.

An embodiment of the present disclosure provides another network interworking system 190. As shown in FIG. 19, the network interworking system 190 may include:

the network interworking configuration network element 90 in any embodiment above, at least one functional network element 150 in a first network in any embodiment above, and at least one functional network element 150 in a second network in any embodiment above.

Figure 20:
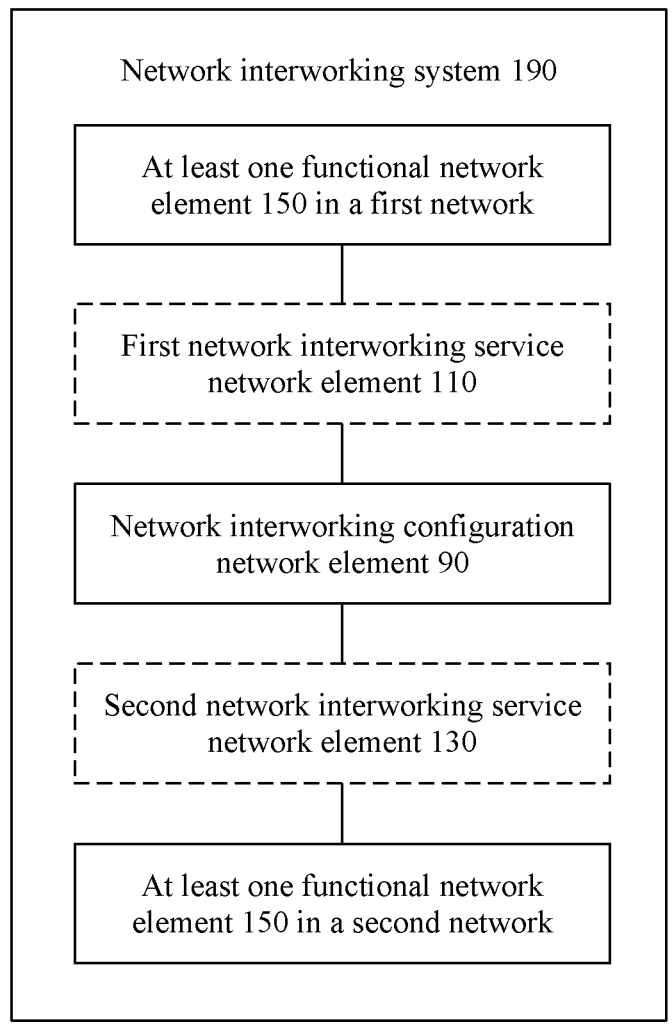
FIG. 20 is a schematic structural diagram of yet another network interworking system according to an embodiment of the present disclosure.

Further, as shown in FIG. 20, the network interworking system 190 may further include the first network interworking service network element 110 in any embodiment above and/or the second network interworking service network element 130 in any embodiment above.

It should further be noted that, FIG. 17 to FIG. 19 merely show examples of an architecture of a network interworking system, and do not limit a quantity of network elements included in the network interworking system and types of the network elements.

Persons of skill in the art should be aware that in one or more of the foregoing examples, the functions described in the present disclosure may be implemented by hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general or dedicated computer. It may be clearly understood by persons skilled in the art that, for the purpose of convenient and brief description, for a detailed working process of the foregoing system, apparatus, and unit, refer to a corresponding process in the foregoing method embodiments, and details are not described herein.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware plus a software functional unit.

When the foregoing integrated unit is implemented in a form of a software functional unit, the integrated unit may be stored in a computer-readable storage medium. The software functional unit is stored in a storage medium and includes instructions for instructing a computer device (which may be a personal computer, a server, a network device, or the like) to perform some of the steps of the methods described in the embodiments of the present disclosure. The foregoing storage medium includes various media that can store program code, such as a USB flash drive, a removable hard disk, a read-only memory (ROM), a random access memory (RAM), a magnetic disk, or an optical disc.

Finally, it should be noted that, the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method, comprising:
   determining, by a network interworking configuration network element, that a first network is requesting to connect to a second network;
   sending, by the network interworking configuration network element to a first network element in a first network element set, a first identifier of a second network element in a second network element set, the second network element corresponding to the first network element in the first network element set;
   sending, by the network interworking configuration network element to the second network element in the second network element set, a third identifier of the first network element in the first network element set;
   sending, by the network interworking configuration network element to a third network element in the first network element set, a second identifier of a fourth network element in the second network element set, the fourth network element corresponding to the third network element in the first network element set, the first network element set comprising network elements in the first network, the second network element set comprising other network elements in the second network, and each network element in the first network element set having a one-to-one correspondence to a corresponding network element in the second network element set; and
   sending, by the network interworking configuration network element to the fourth network element in the second network element set, a fourth identifier of the third network element in the first network element set.

2. The method according to claim 1, further comprising:
   receiving, by the network interworking configuration network element, a network interworking request requesting to connect to the second network from a manager of the first network or from a first network interworking service network element in the first network, the network interworking request comprising a third identifier of the first network and a fourth identifier of the second network.

3. The method according to claim 2, wherein:
   the network interworking request further comprises:
   a fifth identifier of a fifth network element in the first network element set;
   a sixth identifier of the first network interworking service network element;
   a processing manner indication indicating that a connection is to be established or that the connection is to be deleted;
   location information of the first network;
   scale information of the first network;
   a service feature of the first network; or
   a performance requirement of the first network; and
   the method further comprises determining the second network element set based at least on the network interworking request.

4. The method according to claim 1, wherein sending the first identifier of the second network element comprises:
   directly sending, by the network interworking configuration network element to the first network element, the first identifier of the second network element; or
   sending, by the network interworking configuration network element to a first network interworking service network element in the first network, respective network element identifiers of the second network element set.

5. The method according to claim 1, wherein sending the third identifier of the first network element comprises:
   directly sending, by the network interworking configuration network element to the second network element, the third identifier of the first network element; or
   sending, by the network interworking configuration network element to a second network interworking service network element in the second network, respective network element identifiers of the first network element set.

6. The method according to claim 1, further comprising:
   verifying, by the network interworking configuration network element, that the first network is allowed to access the second network.

7. The method according to claim 6, wherein verifying that the first network is allowed to access the second network comprises:
   obtaining, in response to outputting a verification indication to a manager of the second network, an indication from the manager indicating that the first network is allowed to access the second network; or
   determining that the first network meets a preset rule.

8. The method according to claim 1, wherein:
   the first network element set comprises:
   a first authentication, authorization, and accounting (AAA) server in the first network;
   a gateway in the first network; or
   a base station in the first network;
   a fifth network element in the second network set comprises a second AAA server in the second network, the fifth network element being correspondingly connected to the first AAA server in the first network;
   a sixth network element in the second network set comprises a security node in the second network, the sixth network element being correspondingly connected to the gateway in the first network; and
   a seventh network element in the second network set comprises the second AAA server in the second network or the security node in the second network.

9. A network interworking configuration network element, comprising:
   a non-transitory memory storage comprising instructions; and a processor in communication with the non-transitory memory storage, wherein the processor executes the instructions to:
  determine that a first network is requesting to connect to a second network, and
  send, to a first network element in a first network element set, a first identifier of a second network element in a second network element set, the second network element corresponding to the first network element in the first network element set;
  send, to the second network element in the second network element set, a third identifier of the first network element in the first network element set;
  send, to a third network element in the first network element set, a second identifier of a fourth network element in the second network element set, the fourth network element corresponding to the third network element in the first network element set, the first network element set comprising network elements in the first network, the second network element set comprising other network elements in the second network, and each network element in the first network element set having a one-to-one correspondence to a corresponding network element in the second network element set; and
  send, to the fourth network element in the second network element set, a fourth identifier of the third network element in the first network element set.

10. The network interworking configuration network element according to claim 9, wherein the processor executes further instructions to:
  receive a network interworking request requesting to connect to the second network from a manager of the first network or from a first network interworking service network element in the first network, the network interworking request comprising a third identifier of the first network and a fourth identifier of the second network.

11. The network interworking configuration network element according to claim 10, wherein:
  the network interworking request further comprises:
    a fifth identifier of a fifth network element in the first network element set;
    a sixth identifier of the first network interworking service network element;
    a processing manner indication indicating that a connection is to be established or that the connection is to be deleted;
    location information of the first network;
    scale information of the first network;
    a service feature of the first network; and
    a performance requirement of the first network; and
  the processor executes further instructions to determine the second network element set based at least on the network interworking request.

12. The network interworking configuration network element according to claim 9, wherein the instructions to send the first identifier of the second network element comprise further instructions to:
  directly send, to the first network element, the first identifier of the second network element; or
  send, to a first network interworking service network element in the first network, respective network element identifiers of the second network element set.

13. The network interworking configuration network element according to claim 9, wherein the instructions to send the third identifier of the first network element comprise further instructions to:
  directly send, to the second network element, the third identifier of the first network element; or
  send, to a second network interworking service network element in the second network, respective network element identifiers of the first network element set.

14. The network interworking configuration network element according to claim 9, wherein the processor executes further instructions to:
  verify that the first network is allowed to access the second network.

15. The network interworking configuration network element according to claim 14, wherein the instructions to verify that the first network is allowed to access the second network comprise further instructions to:
  obtain, in response to outputting a verification indication to a manager of the second network, an indication from the manager indicating that the first network is allowed to access the second network; or
  determine that the first network meets a preset rule.

16. The network interworking configuration network element according to claim 9, wherein:
  the first network element set comprises:
    a first authentication, authorization, and accounting (AAA) server in the first network;
    a gateway in the first network, or
    a base station in the first network;
  a fifth network element in the second network set comprises a second AAA server in the second network, the fifth network element being correspondingly connected to the first AAA server in the first network;
  a sixth network element in the second network set comprises a security node in the second network, the sixth network element being correspondingly connected to the gateway in the first network; and
  a seventh network element in the second network set comprises the second AAA server in the second network or the security node in the second network.

17. A network interworking system, comprising:
  at least one network element in a first network;
  at least one network element in a second network; and
  a network interworking configuration network element comprising at least one processor and a non-transitory memory storing computer codes which, when executed by the at least one processor, cause the network interworking configuration network element to:
    determine that the first network is requesting to connect to the second network;
    send, to a first network element in a first network element set, a first identifier of a second network element in a second network element set, the second network element corresponding to the first network element in the first network element set;
    send, to the second network element in the second network element set, a third identifier of the first network element in the first network element set;
    send, to a third network element in the first network element set, a second identifier of a fourth network element in the second network element set, the fourth network element corresponding to the third network element in the first network element set, the first network element set comprising network elements in the first network, the second network element set comprising other network elements in the second network, and each network element in the first network element set having a one-to-one correspondence to a corresponding network element in the second network element set; and send, to the fourth network element in the second network element set, a fourth identifier of the third network element in the first network element set.

18. The network interworking system according to claim 17, wherein the non-transitory memory stores further computer codes which, when executed by the at least one processor, further cause the network interworking configuration network element to:

receive a network interworking request requesting to connect to the second network from a manager of the first network or from a first network interworking service network element in the first network, the network interworking request comprising a third identifier of the first network and a fourth identifier of the second network.

* * * * *